United States Patent
Haartsen et al.

(10) Patent No.: US 10,536,039 B2
(45) Date of Patent: Jan. 14, 2020

(54) HYBRID WIRED-WIRELESS COMMUNICATION SYSTEM FOR DELIVERY OF POWER FROM TWO OR MORE SOURCES TO SMART APPLIANCES

(71) Applicant: Koolbridge Solar, Inc., Wrightsville Beach, NC (US)

(72) Inventors: Jaap C. Haartsen, Rolde (NL); Paul Wilkinson Dent, Pittsboro, NC (US)

(73) Assignee: Koolbridge Solar, Inc., Wrightsville Beach, NC (US)

( * ) Notice: Subject to any disclaimer, the term of this patent is extended or adjusted under 35 U.S.C. 154(b) by 211 days.

(21) Appl. No.: 15/839,250

(22) Filed: Dec. 12, 2017

(65) Prior Publication Data
US 2019/0181690 A1 Jun. 13, 2019

(51) Int. Cl.
*H02J 50/40* (2016.01)
*H02J 50/10* (2016.01)
*H02J 7/00* (2006.01)
*H02J 50/80* (2016.01)
*H02J 50/90* (2016.01)

(52) U.S. Cl.
CPC ............ *H02J 50/40* (2016.02); *H02J 7/0024* (2013.01); *H02J 50/10* (2016.02); *H02J 50/80* (2016.02); *H02J 50/90* (2016.02)

(58) Field of Classification Search
CPC ........ H02J 3/005; H02J 13/0075; H02J 50/80; H02J 7/0024; H02J 50/90; H02J 3/383
See application file for complete search history.

(56) References Cited

U.S. PATENT DOCUMENTS

| | | | |
|---|---|---|---|
| 4,433,326 A | 2/1984 | Howell | |
| 4,995,017 A | 2/1991 | Sellati et al. | |
| 5,257,006 A | 10/1993 | Graham et al. | |
| RE36,833 E | 8/2000 | Moore et al. | |
| 6,144,292 A | 11/2000 | Brown | |
| 8,193,661 B2 * | 6/2012 | Jagota | H02J 1/10 307/65 |
| 8,937,822 B2 | 1/2015 | Dent | |
| 9,614,588 B2 | 4/2017 | Dent | |
| 9,785,213 B2 | 10/2017 | Dent | |
| 2002/0031098 A1 | 3/2002 | Pfeiffer | |
| 2002/0060617 A1 | 5/2002 | Walbeck et al. | |

(Continued)

FOREIGN PATENT DOCUMENTS

| | | |
|---|---|---|
| WO | 9216920 A1 | 10/1992 |
| WO | 2008113052 A1 | 9/2008 |
| WO | 2016123463 A2 | 8/2016 |

*Primary Examiner* — Jared Fureman
*Assistant Examiner* — Duc M Pham
(74) *Attorney, Agent, or Firm* — Coats & Bennett, PLLC

(57) ABSTRACT

A communications system is described providing the ability to intelligently deliver electrical power from a first power source or from a second power source to a branch circuit in a facility, such as a home. Communications between a Smart Load Center (SLC) controller and the appliances is provided via a combination of signals sent over the electrical wiring and signals sent over the air. In particular, the signals over the electrical wiring serve to identify to which branch circuit the appliance is connected. The signals over the air support the communications between the appliances and the SLC controller, and may be part of a larger Internet-of-Things ecosystem dedicated to facilities automation services.

35 Claims, 17 Drawing Sheets

(56) References Cited

U.S. PATENT DOCUMENTS

| | | |
|---|---|---|
| 2002/0110311 A1 | 8/2002 | Kline |
| 2002/0154000 A1 | 10/2002 | Kline |
| 2004/0262997 A1* | 12/2004 | Gull .................. H02J 3/005 |
| | | 307/64 |
| 2007/0176723 A1 | 8/2007 | Renz et al. |
| 2008/0007879 A1 | 1/2008 | Zaretsky et al. |
| 2008/0167755 A1* | 7/2008 | Curt .................. G07F 15/003 |
| | | 700/293 |
| 2008/0316004 A1 | 12/2008 | Kiko |
| 2009/0251003 A1 | 10/2009 | Umemura et al. |
| 2010/0008692 A1 | 1/2010 | Kim et al. |
| 2011/0210717 A1 | 9/2011 | Hilton et al. |
| 2012/0076050 A1 | 3/2012 | Masuda |
| 2012/0128078 A1 | 5/2012 | Billingsley et al. |
| 2012/0195355 A1 | 8/2012 | El-Essawy et al. |
| 2012/0275526 A1 | 11/2012 | Hughes |
| 2013/0076132 A1 | 3/2013 | Cohen et al. |
| 2013/0320769 A1 | 12/2013 | Sawyers |
| 2014/0062191 A1* | 3/2014 | Bryson .................. H02J 1/12 |
| | | 307/26 |
| 2014/0084687 A1 | 3/2014 | Dent |
| 2014/0088780 A1 | 3/2014 | Chen |
| 2014/0211345 A1 | 7/2014 | Thompson et al. |
| 2015/0066231 A1 | 3/2015 | Clifton |
| 2015/0087169 A1 | 3/2015 | Elwart |
| 2015/0249337 A1 | 9/2015 | Raneri et al. |
| 2019/0052075 A1* | 2/2019 | Dent .................. H02H 7/1227 |

\* cited by examiner

HYBRID WIRED-WIRELESS COMMUNICATION SYSTEM FOR DELIVERY OF POWER FROM TWO OR MORE SOURCES TO SMART APPLIANCES

FIELD OF INVENTION

The present invention relates generally to the efficient use of intermittent renewable energy sources such as photovoltaic solar power, and in particular to the smart control of appliances by dynamically switching power from either of two power sources, such as grid power and solar panels.

BACKGROUND

In the face of global climate change, generally attributed to the burning of fossil fuels, there is a large interest in renewable power sources, such as solar and wind energy. Global demand has driven the cost of photovoltaic (PV) panels consistently lower—a drop of over 70% in the decade since 2006. Lower costs, together with incentives such as the U.S. Solar Investment Tax Credit, have contributed to a sharp rise in the installation of both residential and commercial solar power facilities. The U.S. achieved one million solar installations in 2016, generating over 29 GW of electricity.

In electrical installations served by an electric utility, power enters the installation at a Service Entrance into a Main Service Panel. In U.S. residential installations, power entering the main service panel comprises two 120-volt anti-phase 60 Hz feeds designated L1 and L2 plus a common neutral, N. In commercial installations, a 3-phase service is often supplied, comprising L1, L2, L3, and N. In other places in the world, a single-phase residential system may comprise only one 240 volt 50 Hz feed L, plus N.

The most common method of exploiting solar energy has been the so-called "grid-tied" system, in which DC power from solar cells is converted to AC power and fed backwards through the electrical meter to offset consumption from the grid. Many states in the USA have passed regulations mandating that electrical utilities shall permit this so-called net-metering system in which the cost of power consumed from the grid at one time of day is offset by a credit received for power fed back to the grid at a different time. However, as the amount of installed solar power increases, the electric utilities are starting to experience difficulties in absorbing the total amount of back-fed power during the peak sun hours and as a result, the end is in sight of the economic benefit for consumers in being able to feed power back to the grid when they are not at home to use it otherwise.

U.S. Pat. No. 8,937,822 to one of the present co-inventors, describes an alternative to net metering for solar power, which instead facilitates self-consumption of own, solar-derived power. This system features automatic, circuit-by-circuit transfer switches to select, for each branch circuit, whether it receives solar power or grid power. This decision is based on, among other things, the total amount of solar power being received at any moment. In order to use solar power to directly power loads, energy storage (i.e., a storage battery) must be used to average out the difference between solar power instantaneously received and the varying consumption of the home or business. Thus, solar energy received when the homeowner is not at home to use it can be stored in the battery and released for use when the homeowner is home.

FIG. 1 illustrates the power distribution portion of the Smart Load Center (SLC) disclosed in the above-incorporated '822 patent. It may be seen that, in contrast to the two power busses that normally extend down the center of a conventional breaker panel, and into which the circuit breakers are connected, the SLC includes four power bus bars—two for solar power or other alternative energy source, and two for utility grid power or other primary energy source. Quadruple bus bar 3000 is sized to handle at least 60 amps on each solar input lug L1 and L2 (3001) and at least 60 amps on each utility power input lug L1 and L2 (3002). The panel of FIG. 1 is typically installed as a sub-panel and fed from the main service panel through a 60 A or 100 A, two-pole feeder breaker. The solar input may be derived from a solar DC-to-AC load inverter (not shown), which is already electronically current limited. Single Pole, Double Throw (SPDT) relays 3003 are used to select power to each pole of each breaker either from one of the solar power bus bars or from a utility power bus bar. On each side, the breakers alternate between using L1 and L2, so that a pair of adjacent slots may be used for a double pole (240 V) circuit, such as needed for a well pump or tumble dryer. Each relay is controlled by a SLC controller, which may for example comprise an appropriately programmed microprocessor (not shown in FIG. 1, but its functions are described in more detail in the '822 patent). Each circuit breaker 3004/3005 leads to a branch circuit (not shown) that is routed through the house, thus providing electrical power to one or more appliances. Typically, several outlets are connected in parallel in the branch circuit, and appliances and other electrical equipment may be plugged into the outlets.

The energy provisioning and load demand by the appliances can change over time, and a dynamic scheduling is required. Based on the energy demand in the house and on the energy available from the grid and the alternative power source like solar, appliances can be connected to grid or solar power. To make this system work, two communication functions must be fulfilled:

Identification of which appliance is connected to which branch circuit, and

Communication from the appliance to the Smart Load Center to reveal its need.

In WO 2016123463 A2 and its Continuation-in-Part US 2016/0224083 A1 to one of the present co-inventors, a method has been described to use a low-rate Power Line Communication (PLC) system to provide the identification and communication elements. These documents are hereby incorporated by reference in their entireties. This low-rate PLC system makes use of inductively injecting information signals on a common mode of the Live and Neutral wires.

Another trend which has recently received a lot of attention is Home Automation. Home automation is part of a bigger trend called Internet-of-Things (IoT), which is a form of machine-to-machine (M2M) communication where any device can be connected to the Internet, either to provide (sensory) data or to be remotely controlled. For Home Automation, this means that appliances like the refrigerator, the washing machine, the electric stove, and also HVAC, are connected to the Internet and can be queried and controlled remotely via applications (apps) on a smartphone. For ease of use, the communications within the IoT ecosystem in general, and for Home Automation in particular, is wireless, based on standard and widely used protocols like WiFi and Bluetooth. Release 13 of the $3^{rd}$ Generation Partnership Project (3GPP) defines three technologies to support M2M communications over cellular networks: Extended Coverage GSM Internet of Things (EC-GSM-IoT), LTE for Machine-Type Communications (LTE-M), and Narrowband Internet of Things (NB-IoT).

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, novel and nonobvious aspects of a Smart Load Center facilitate the dynamic, selective, programmable provision of power from two or more different sources to individual appliances. The Smart Load Center includes a SLC controller, which controls multiple relays located in a Smart Power Distribution Unit controlling energy provisioning on a circuit-by-circuit basis. By switching each branch circuit independently between, e.g., grid power and solar power, each appliance or group of appliances may be dynamically driven by either power source. Communication between the Smart Load Center and the appliances is provided via a combination of signals sent over the electrical wiring and signals sent wirelessly. In some embodiments, the signals over the electrical wiring mainly serve to identify to which branch circuit the appliance is connected. The wireless signals support the communications between the appliances and Smart Load Center, and may be part of a larger Internet-of-Things ecosystem.

One embodiment relates to a method, performed by a SLC controller, of dynamically, selectively, and individually delivering power from one of two or more sources to a smart appliance in a facility. A unique identifier is sequentially broadcast on each of two or more branch circuits in the facility via powerline communications over the branch circuit wires. An indication of to which branch circuit the smart appliance is connected, is received from the smart appliance. The branch circuit to which the smart appliance is connected is selectively connected to one of the two or more power sources, so as to power the smart appliance from the selected power source.

Another embodiment relates to a method, performed by a smart appliance, of facilitating the dynamic, selective, and individual delivery of power from one of two or more sources to the smart appliance in a facility. A unique identifier of a branch circuit, to which the smart appliance is connected for power, is received via powerline communications. An identification of the smart appliance and the branch circuit identifier are transmitted to a SLC controller. Power is receiving over the branch circuit wires from one of the two or more sources, the power source selected by the SLC controller in response to the smart appliance identification and the branch circuit identifier.

Yet another embodiment relates to a Smart Load Center. The SLC includes a first input operative to receive electrical power from a first power source and a second input operative to receive electrical power from a second power source. The SLC also includes a plurality of branch circuit outputs and a plurality of switches. Each switch is operative to connect a branch circuit alternatively to the first or second power source. The SLC further includes a plurality of powerline communication (PLC) transceivers. Each PLC transceiver is operative to transmit and receive data over one or more power distribution wires of a branch circuit. Finally, the SLC includes an SLC controller, which includes a wireless transceiver. The SLC controller is operative to sequentially broadcast, on each successive branch circuit, a unique branch circuit identifier using powerline communications; wirelessly receive, from a smart appliance connected to a branch circuit, an indication of usage and the unique identifier of the branch circuit to which the smart appliance is connected; and control a switch associated with the identified branch circuit to supply power from the first or the second power source to the smart appliance.

Still another embodiment relates to a smart appliance. The smart appliance includes an electrical load; a processor; a powerline communication receiver; and a first wireless transceiver.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 1:
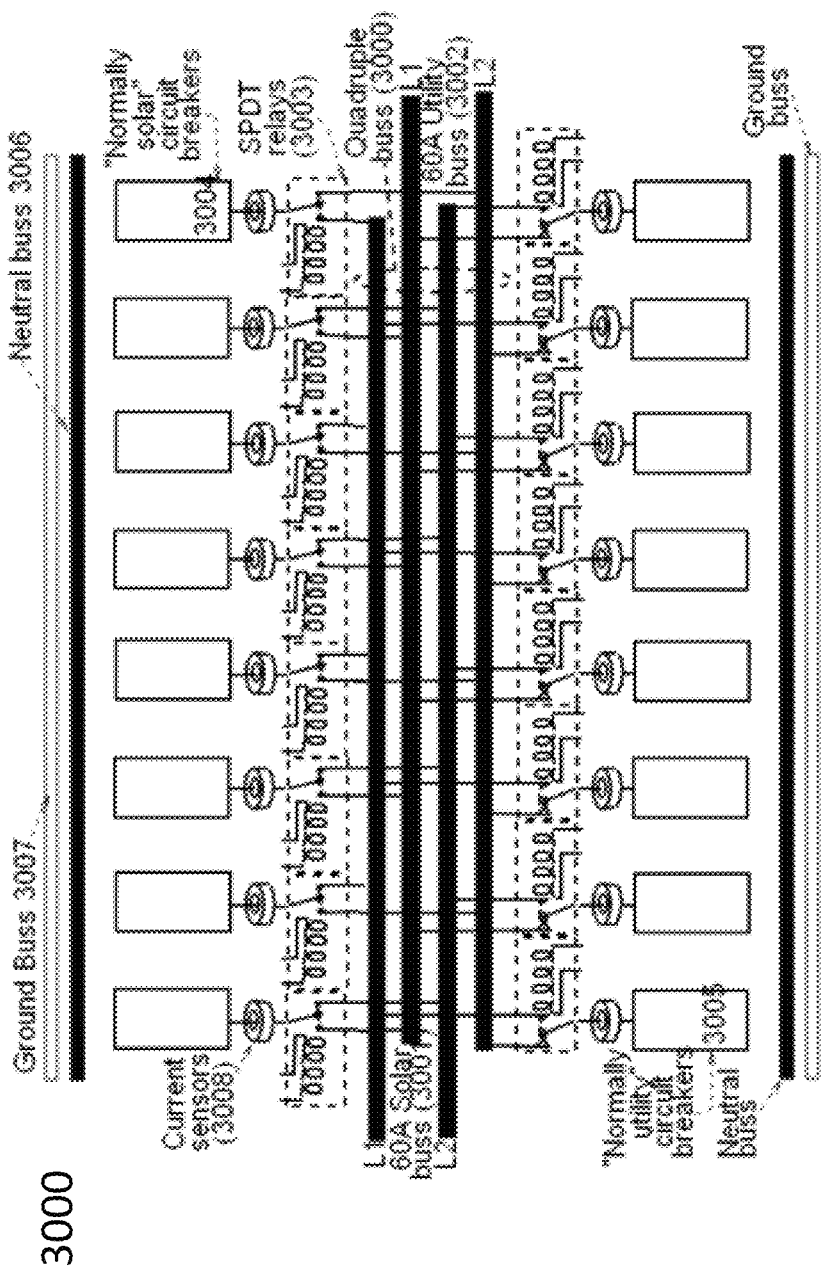
FIG. 1 is a functional block diagram of the smart power distribution unit of a Smart Load Center supporting circuit-by-circuit power switching of the '822 patent.
Figure 2:
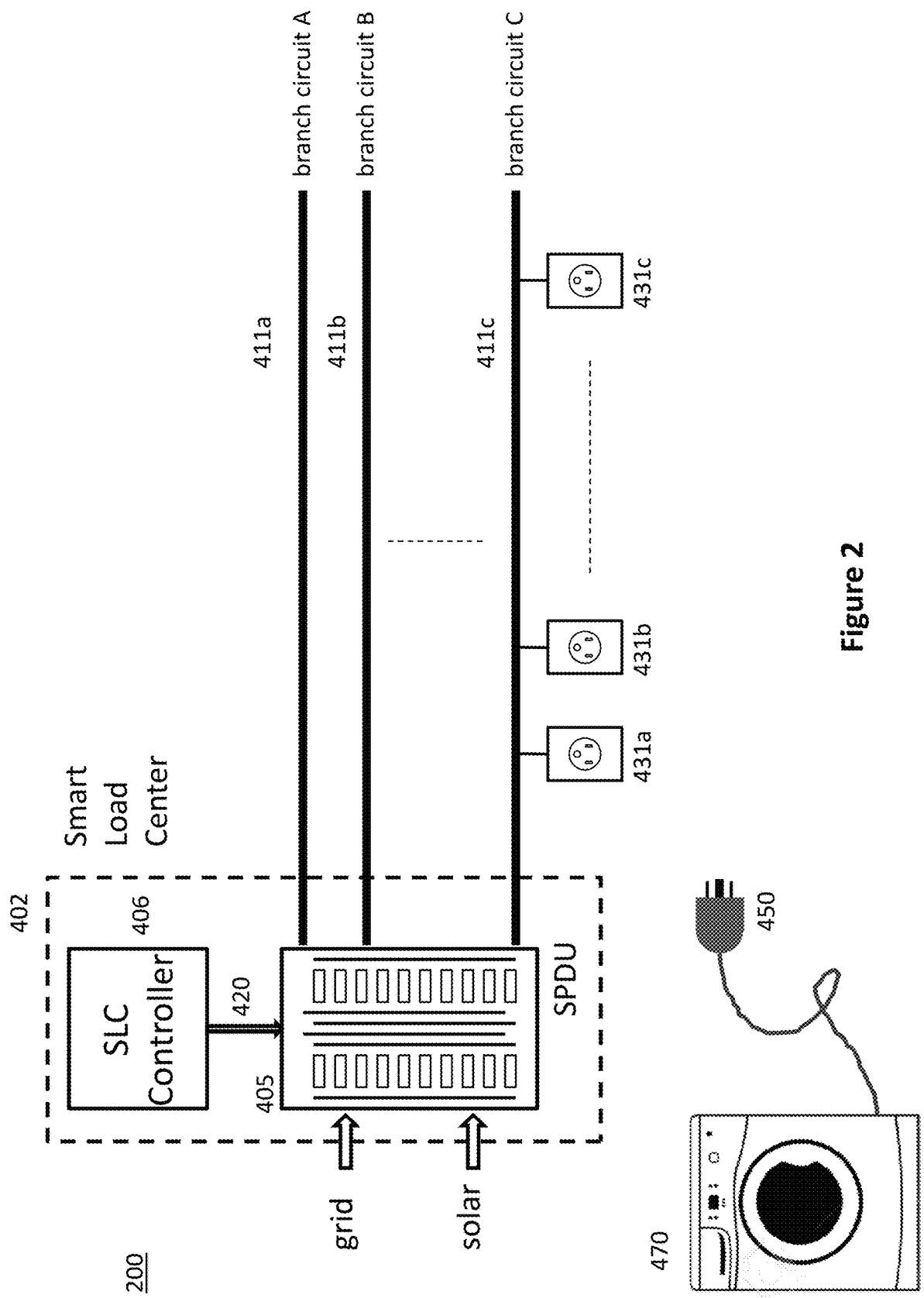
FIG. 2 is a functional block diagram of the overall architecture with all capable appliances in a facility, such as a residence, equipped with smart energy provisioning.

A generalized, high-level overview 200 of dual-power system is shown in FIG. 2. A Smart Load Center 402 comprises a SLC controller 406 controlling a Smart Power Distribution Unit 405 (SPDU). The SPDU 405 receives both grid power and alternative power (e.g., solar or wind power), and contains the circuit breakers and leakage detection circuits such as Ground Fault Circuit Interrupter (GFCI) for electrical protection. The SLC controller 406 communicates with the SPDU 405 using communication line 420, which can be a wired link based on UART, USB, or I2C, among others, or a wireless link, for example WiFi or Bluetooth. The SLC controller 406 includes one or more wireless transceivers, a processor, memory, and a system control program. Several branch circuits 411 leave the SPDU 405, distributing electrical power over the electrical wiring within the premises. As depicted in FIG. 1, SPDT relays 3003 are present in the SPDU 405 to connect an individual branch circuit 411 to the grid power or to the alternative energy source. Many of the branch circuits include one or more outlets 431. Outlets connected to the same branch circuit either all provide grid power or all provide alternative power.

Figure 3A:
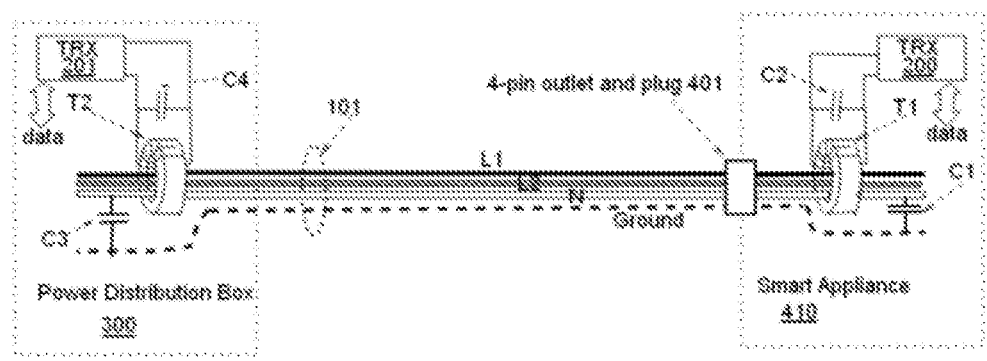
FIG. 3A is a functional block diagram of the Power Line Communication concept using inductive coupling as described in the WO 2016/123463 A2 application.
Figure 3B:
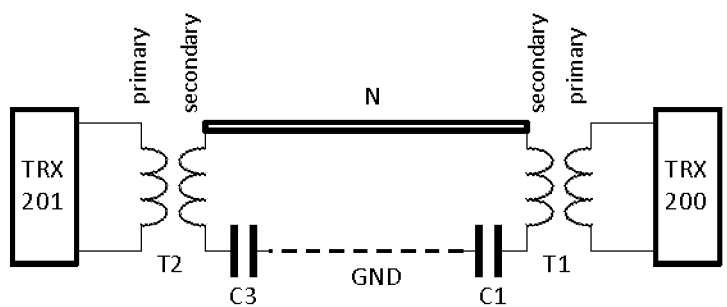
FIG. 3B is an equivalent circuit diagram of FIG. 3A.

In order for the Smart Load Center (SLC) 406 to connect the appliance 470 with the proper energy source, the SLC 406 should know to which branch circuit 411 the appliance 470 is connected. For this, signaling over the electrical wiring is applied. Several Power Line Communication (PLC) technologies have been developed to carry data over electrical wiring. Examples are narrowband systems like ITU-TG.9903, ITU-TG.9904, or IEEE 1901.2, and wideband systems like IEEE 1901 or ITU G.hn. These systems are rather complex, using OFDM modulation to provide high data rates, or to overcome large delay spread over long distances. A preferred PLC technology has been described in WO 2016123463 A2, the basics of which are shown in FIGS. 3A and 3B.

The electrical signals generated in transceiver 201 are inductively injected onto the common mode of Live and Neutral wires by coil T2, and picked up remotely by a coil T1. FIG. 3B depicts how the Live-Neutral wires together with the Ground (GND) wire form one winding of the secondary windings of the two transformers T1 and T2. The current loop of the winding is closed by C1 and C3, which form a short circuit at the signal carrier frequency and an open circuit at the powerline frequency. A PLC transceiver TRX 201 is placed at the beginning of every branch circuit leaving the Smart Power Distribution Unit 405. Every Smart Appliance has a PLC transceiver TRX 200 to receive the signals sent by PLC transceiver TRX 201. To avoid interference, and to achieve isolation of the communication loop using the Ground wire, the PLC signal frequency should be far above the powerline frequency of 50 or 60 Hz. In one embodiment, a frequency of about 350 kHz is a suitable carrier frequency.

Figure 4:
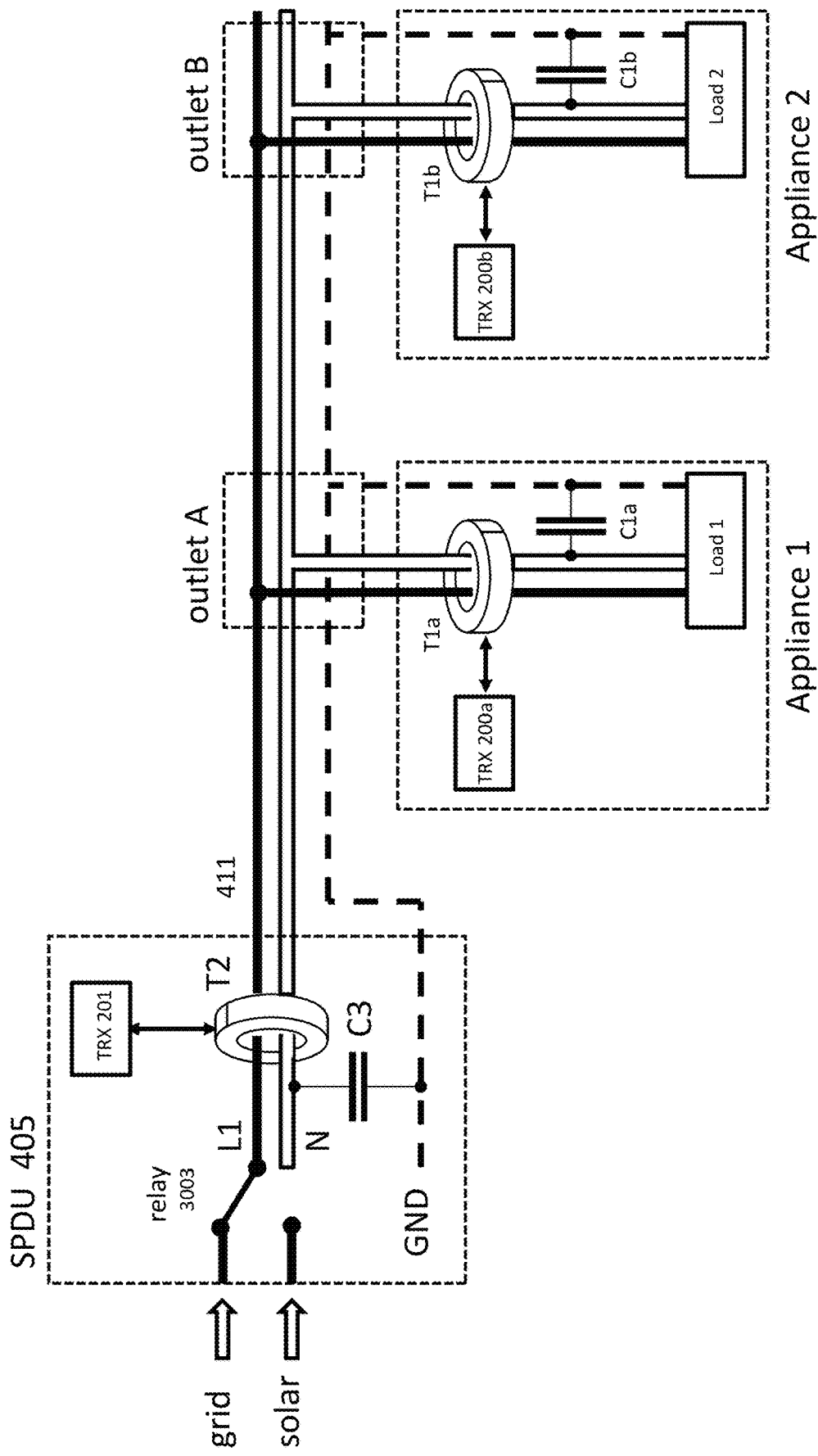
FIG. 4 is a functional block diagram of the PLC concept according to the WO 2016/123463 A2 application for multiple appliances.

If more than one appliance is connected to a branch circuit 411, a parallel connection is made as depicted in FIG. 4. Each appliance is equipped with a PLC transceiver TRX 200 coupling and detecting current signals via coil T1. Since the power selection (grid or alternative power) is selected per branch circuit by SPDT relay 3003, all appliances connected to the branch circuit share the same power source. Once individual communication is established with each smart appliance on a branch circuit, as described herein, the SLC controller 406 can perform load balancing by dynamically controlling the smart appliances. For example, one or more smart appliance may be directed to start, delay, or cease a task. For example, a dish washer and clothes washer—whether on the same or different branch circuits—may be controlled such that their washing operations do not occur simultaneously.

Figure 5:
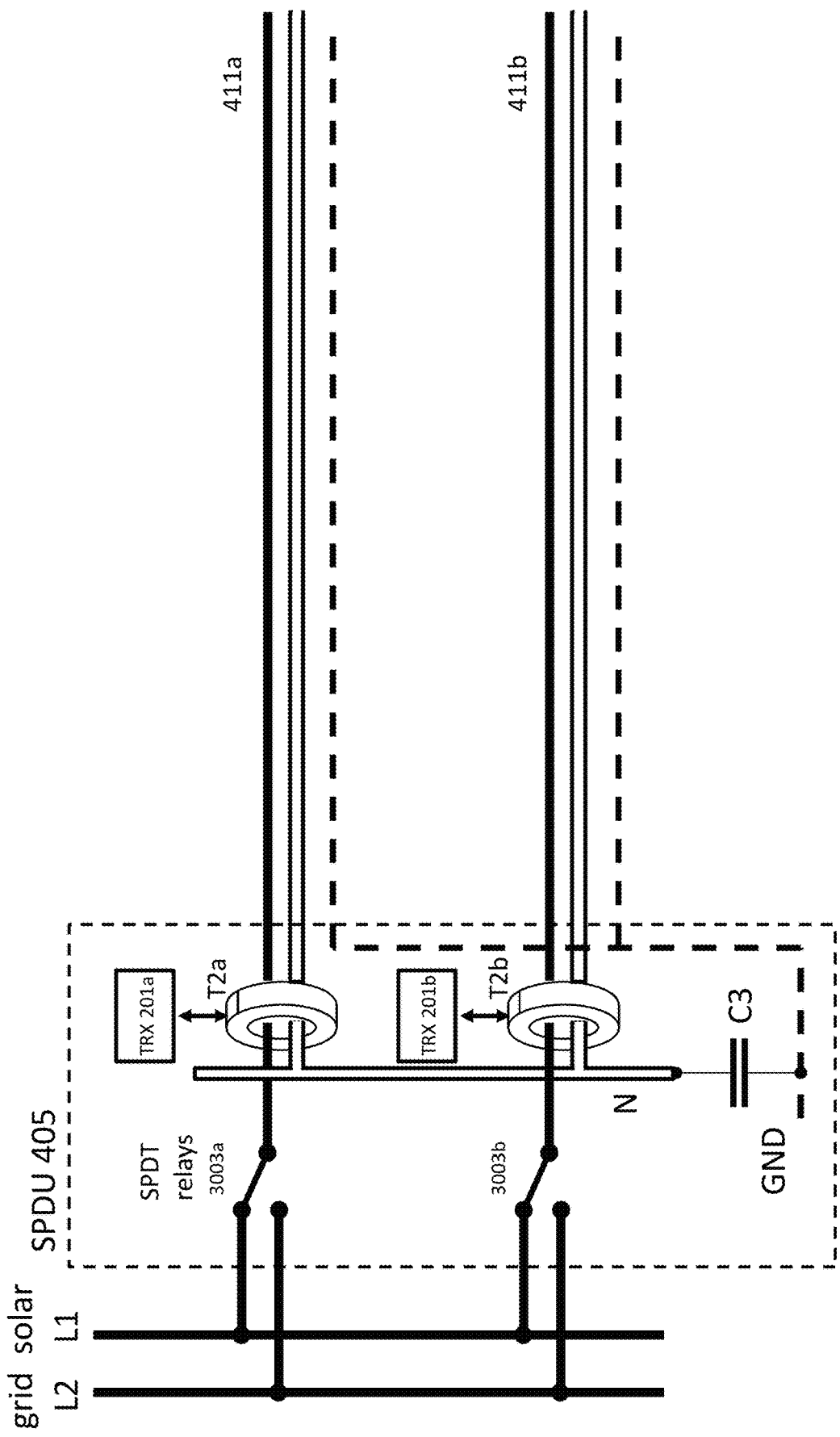
FIG. 5 is a functional block diagram of the PLC transceiver components present in the smart power distribution unit.

As depicted in FIG. 5, since more than a single branch circuit 411 is present in the SPDU 405, each circuit has its own PLC transceiver TRX 201. Since the Neutral wire is connected to Ground GND (usually at the Service Entrance where the utility enters the house—not shown in FIG. 5), the loops are closed to make the PLC concept with the coils work. However, since the point at which the Neutral is shorted to ground may be at some distance from the SPDU 405 (for example, 10 m or 30 ft.), at the PLC carrier frequency, an inductance is seen, not a short circuit. The inductance is formed by the Neutral wire leading to the Service Entrance, which acts as a shunted transmission line. To prevent resonance effects of this inductance, a sufficiently large capacitance C3 is placed in the SPDU 405 to short-circuit Neutral to ground for the PLC signals. Since C3 cannot be too large (to avoid a leakage current at 60 Hz that can trip a GFCI), some crosstalk will remain between the branch circuits. That is, signals transmitted by TRX 201a on circuit 411a will be heard on branch circuit 411b, although at a much lower signal power. Further isolation between the branches can be achieved by replacing C3 with a series resonance of a capacitor and an inductance, which resonates at the PLC carrier frequency. For example, an inductance of 4.4 µH in series with a capacitance of 47 nF will form a short circuit at 350 kHz. With the methods described above, isolation well in excess of 30 dB can be obtained. To further reduce cross interference between different branch circuits, in one embodiment the PLC system is designed such that only a single PLC transceiver TRX 201 in the SPDU 405 is activated at any moment in time. Time Division Multiplexing is applied, controlled by the SLC controller 406 activating the different PLC transceivers in a round-robin fashion, or based on some priority scheme which may give certain branch circuits more bandwidth than others.

Figure 6:
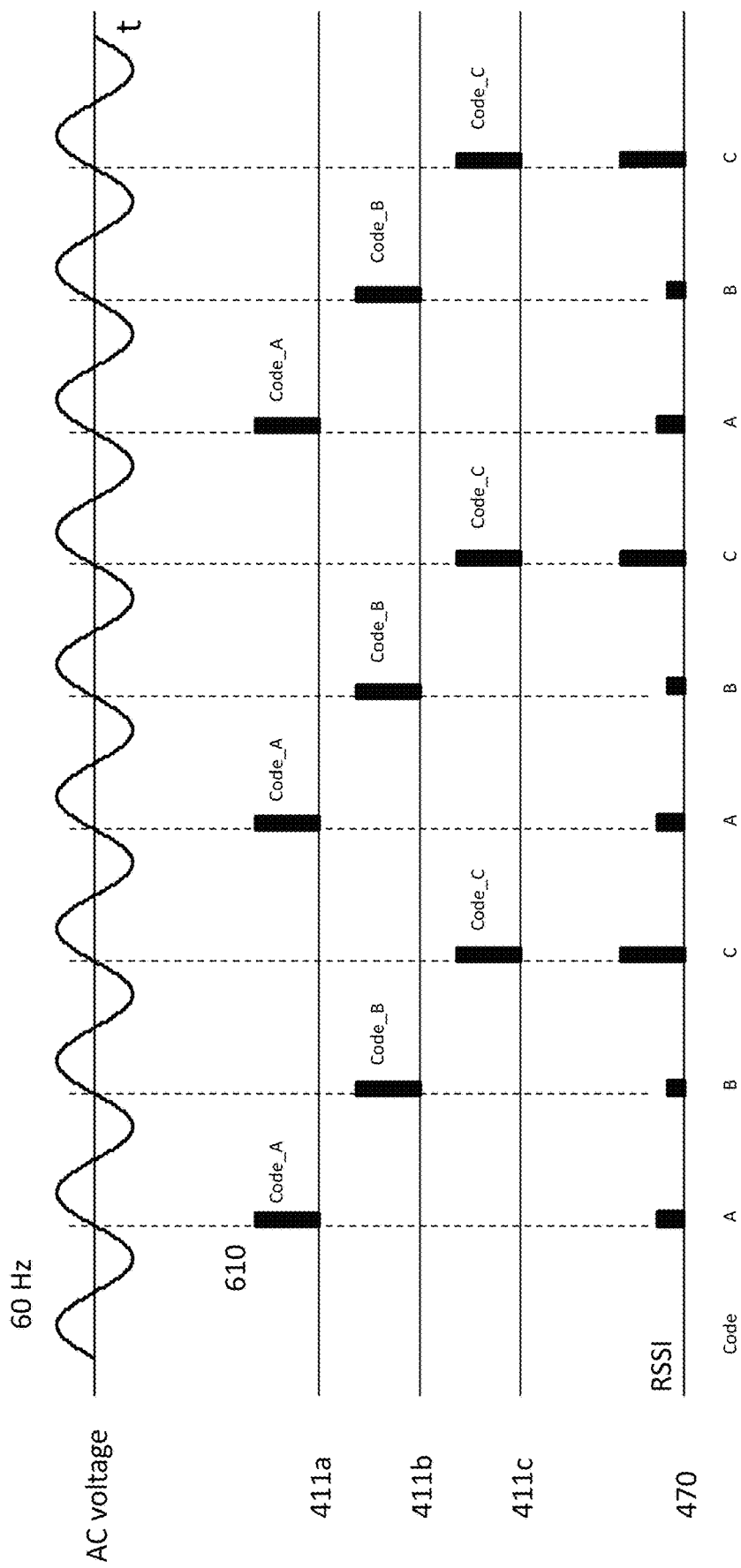
FIG. 6 is a timing diagram of PLC circuit identification broadcast over the electrical wiring to help identify to which branch circuit an appliance is connected.

In order to identify to which branch circuit an appliance is connected, the SLC controller 406 sequentially instructs the PLC transceivers TRX 201 in FIG. 5 to broadcast a short burst (pulse). To avoid requiring each Smart Appliance PLC transceiver TRX 200 to listen all the time for this burst, the burst is preferably sent at a specific time instance known to the PLC transceivers TRX 200. In one embodiment, the AC voltage at 60 Hz is used as a common synchronization clock. FIG. 6 shows how three bursts 610 are sequentially sent on each of branch circuits 411*a*, 411*b*, and 411*c*. The bursts are sent at the zero crossing on the rising edge of the 120 VAC power waveform. In one embodiment, the burst contains a code that identifies the branch circuit on which it was sent. Due to crosstalk, a burst sent on 411*a* will also be detected on 411*b* and 411*c*. However, due to the isolation between the branches, its amplitude will be much lower. In case the isolation between the circuits is very large, the crosstalk may be negligible in which case the appliance will only reliably receive the burst sent on its own branch circuit.

One or more appliances 470 listen at the rising edge zero crossing of the power waveform for the burst to arrive. When a burst arrives, the appliance 470 measures the signal strength RSSI (Received Signal Strength Indication), a concept well known in radio communications. For example, if an appliance 470 is connected to circuit 411*c*, it will hear the burst carrying Code C, sent on branch 411*c*, with the highest amplitude. Yet, due to crosstalk, it may also detect the bursts sent on 411*a* and 411*b*. The appliance 470 compares the RSSI of all the received bursts, and selects the strongest one. The appliance 470 then reports the associated burst code (code C in the example of FIG. 6) back to the SLC controller 406. In one embodiment, reporting back is done via the PLC system; in other embodiments it is done wirelessly as is explained further herein.

The burst may consist of multiple symbols of logical ones and zeroes to form a code sequence. The symbol may consist of a 350 kHz carrier for a logical one and no carrier for a logical zero, resulting in On-Off Keying (OOK). Alternatively, a logical one may be represented by a carrier at 340 kHz and a logical zero by a carrier at 360 kHz, thus providing Frequency Shift Keying (FSK). Other modulation schemes may be considered, optimized for the propagation path formed by the electrical wiring and the transformers (coils). Codes of, for example, 64 symbols may be used, where a coding scheme is used with sufficient (Hamming) distance between the code words. In the PLC receiver TRX 200 in the appliance 470, the incoming signal may be correlated against all possible code words A, B, and C. The code word that matches the incoming signal will provide the largest correlation output. The detected code word, and the corresponding RSSI value and/or correlation value, are reported by the appliance 470 to the SLC controller 406.

In order to overcome noise and interference present on the branch circuit, the burst may be sent at a relatively high power level like 10 or 20 dBm. Since the burst will be short (in the order of a few ms), and will only be sent sporadically, the average energy consumption will be very low, as well as any spurious emission that may result from the burst transmission. Further resilience against noise and interference is obtained by the coding gain provided by the code words as discussed above.

In the example of FIG. 6, synchronization of the transmission and reception exploits the 60 Hz AC voltage waveform, which acts as a common clock present at both the SPDU 405 and appliance 470. Codes are used to differentiate between the bursts sent on the different branch circuits. Other methods are known in the art to obtain synchronization and burst differentiation. For example, the SLC controller 406 and appliance 470 may share a common clock provided by a wireless connection. The SLC controller 406 may keep a record of the time instances when the different bursts are sent on the different branch circuits. On arrival of the burst, the appliance 470 may create a time stamp, based on the shared clock, and report back the signal strength (RSSI) and the time stamp. The SLC controller 406 can then determine on which branch circuit the burst was sent. In this case, the burst sent on the circuit does not have to have a unique code, as the time stamp reveals which circuit is activated.

Since there is little propagation loss over the wire and the appliances are placed in parallel as depicted in FIG. 4, all appliances 470 on a branch circuit 411 will receive the PLC signals at about the same signal strength. As a consequence, all appliances 470 connected to the same branch circuit 411 will select the same burst associated with the strongest RSSI.

Figure 7:
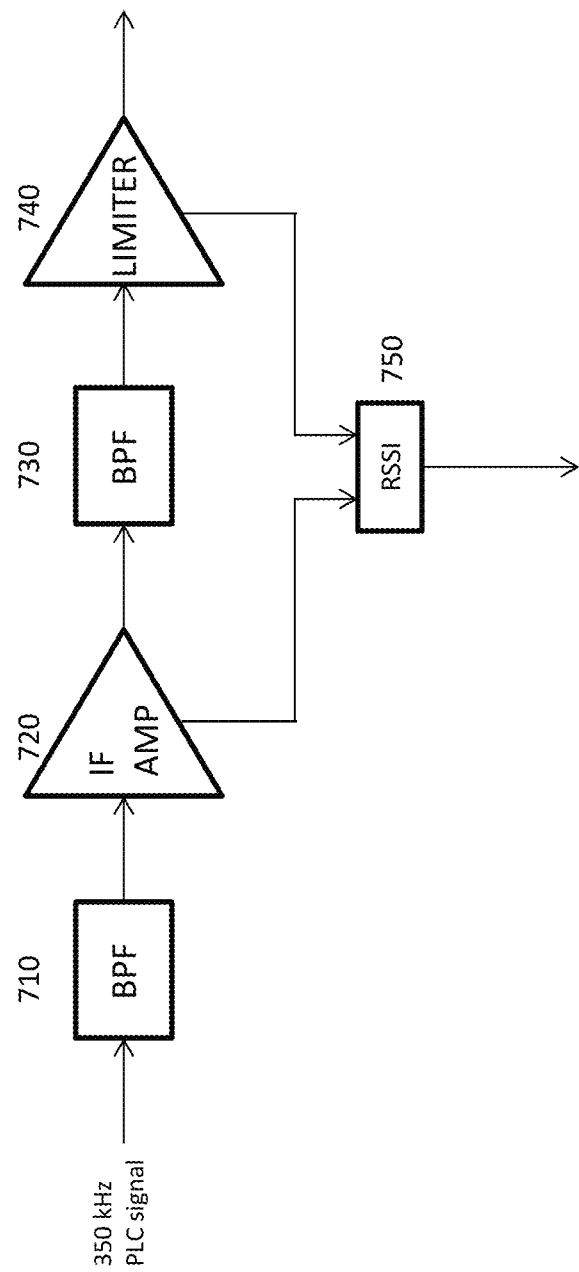
FIG. 7 is a representative circuit diagram of receiver gain stage components with RSSI measuring capabilities.

PLC transceivers TRX 200 and TRX 201 require the capability to measure RSSI. In FIG. 7, some gain stage components are shown that can be found in, for example, the Philips SA605 mixer FM IF system. Band-pass filter BPF 710 suppresses all signals outside the band of interest. An IF amplifier 720 amplifies the received signal to a first level. Subsequently, a second band-pass filter BPF 730 further suppresses signals outside the band of interest. Finally, limiting stage 740 hard-limits the signal. The gain stages in both the IF amplifier 720 and the limiter 740 provide information to the RSSI unit 750 that determines the strength of the received signal.

Currently, there is a growing interest in a new phenomenon called Internet-of-things (IoT). The idea is that each machine will be able to connect (wirelessly) to the internet. The concept of machine can be interpreted very broadly, ranging from a streetlamp to a washing machine. In addition, Home Automation receives quite some attention by big industry players from the consumer industry, such as Google, Apple, Amazon, Whirlpool, GE, etc. When all machines and devices in the home are in some way connected wirelessly, they can be controlled from a central point in the house, or even remotely via a smartphone.

Figure 8:
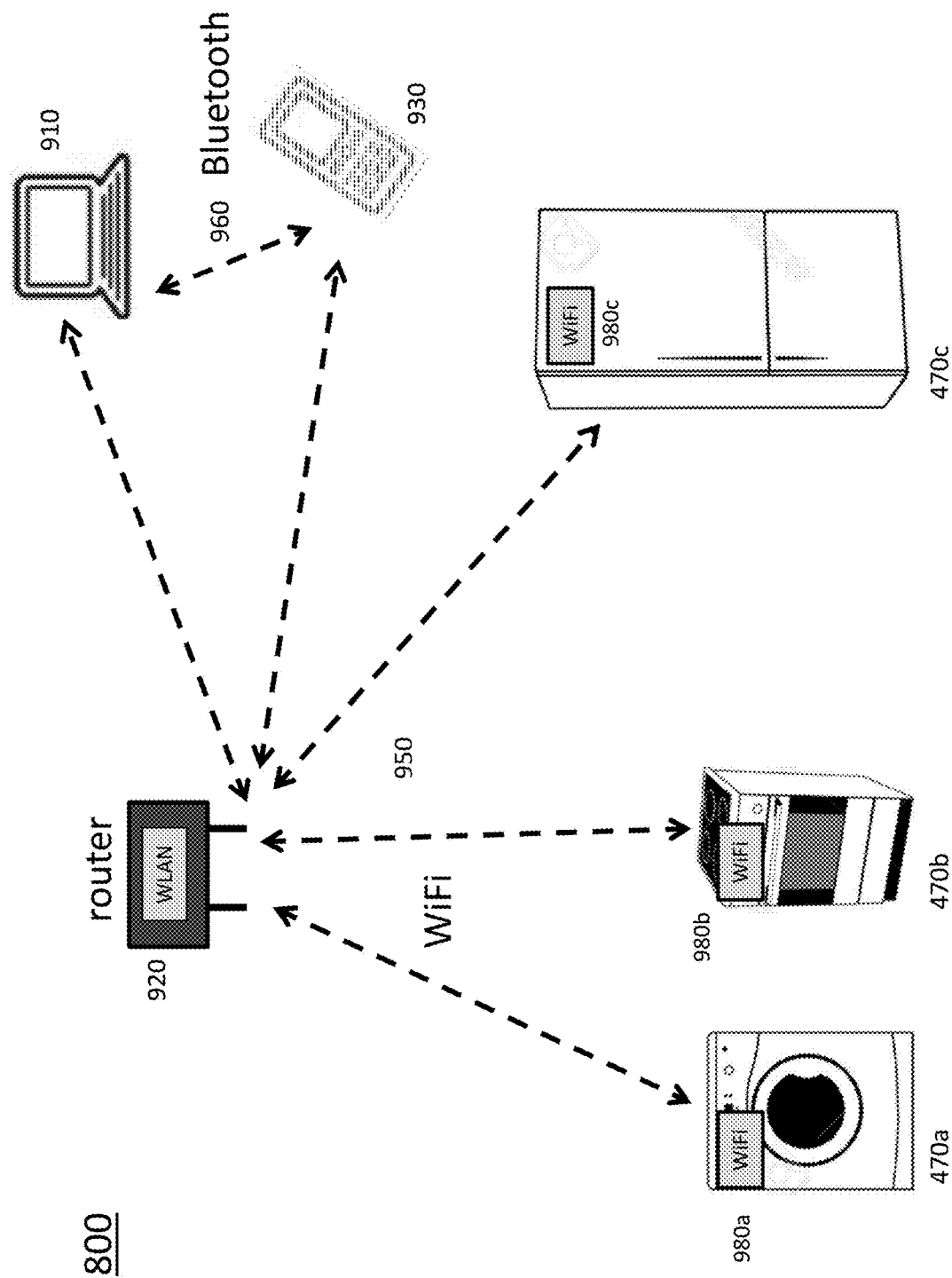
FIG. 8 is a network diagram of a home automation architecture.

In FIG. 8, a typical Home Automation architecture 800 is shown as envisioned by many players in the industry. Machines and devices are wirelessly linked via connection 950 based on an RF technology like WiFi (IEEE 802.11 WLAN), ZigBee (IEEE 802.15.4), Bluetooth, or some proprietary standard like Z-Wave. A wireless local area network (WLAN) router 920 provides coverage in the home and possibly the garden, and connects to various home appliances such as a washing machine 470*a*, a stove 470*b*, and a refrigerator 470*c*. These appliances are remotely controlled via a central home controller 910, for example a personal computer. In addition, the appliances 470 can be controlled remotely via an app on a smartphone 930 that controls the appliances via the router 920 and wireless link 950, or via the home controller 910 using wireless link 960. Different short-range radio technologies can be supported by the smartphone 930 to support the link 960, e.g., Bluetooth or WiFi-Direct. Currently, so-called smart appliances 470 from different vendors are entering the market. These appliances are equipped with a wireless transceiver 980 supporting WiFi and may include Bluetooth as well, and thus form part of the IoT ecosystem.

In some embodiments, the wireless communications architecture of the Home Automation of FIG. 8 is combined with the power line communications described with reference to FIGS. 3 to 7. Although the PLC technology is able to provide a bi-directional communications link between appliances 470 and the SLC 406, preferably the transceivers are a low-cost add-on to the existing electrical wiring and existing appliances. This can be accomplished with low data rate, using simple transceiver implementations, and is optimal for identifying the branch circuits to which the appliances are connected. As described above, only a one-directional broadcast signal from the SLC 406 needs to be sent over the electrical wiring to identify, to the appliances 470, the branch circuit 411 to which they are connected. In some embodiments, all other communications may occur wirelessly using the infrastructure now being implemented for Home Automation and Internet-of-Things. The wireless technologies envisioned can support higher data rates (e.g., a few Mb/s), and are expected to include sophisticated security components, for example based on Elliptic Curve cryptology.

Figure 9:
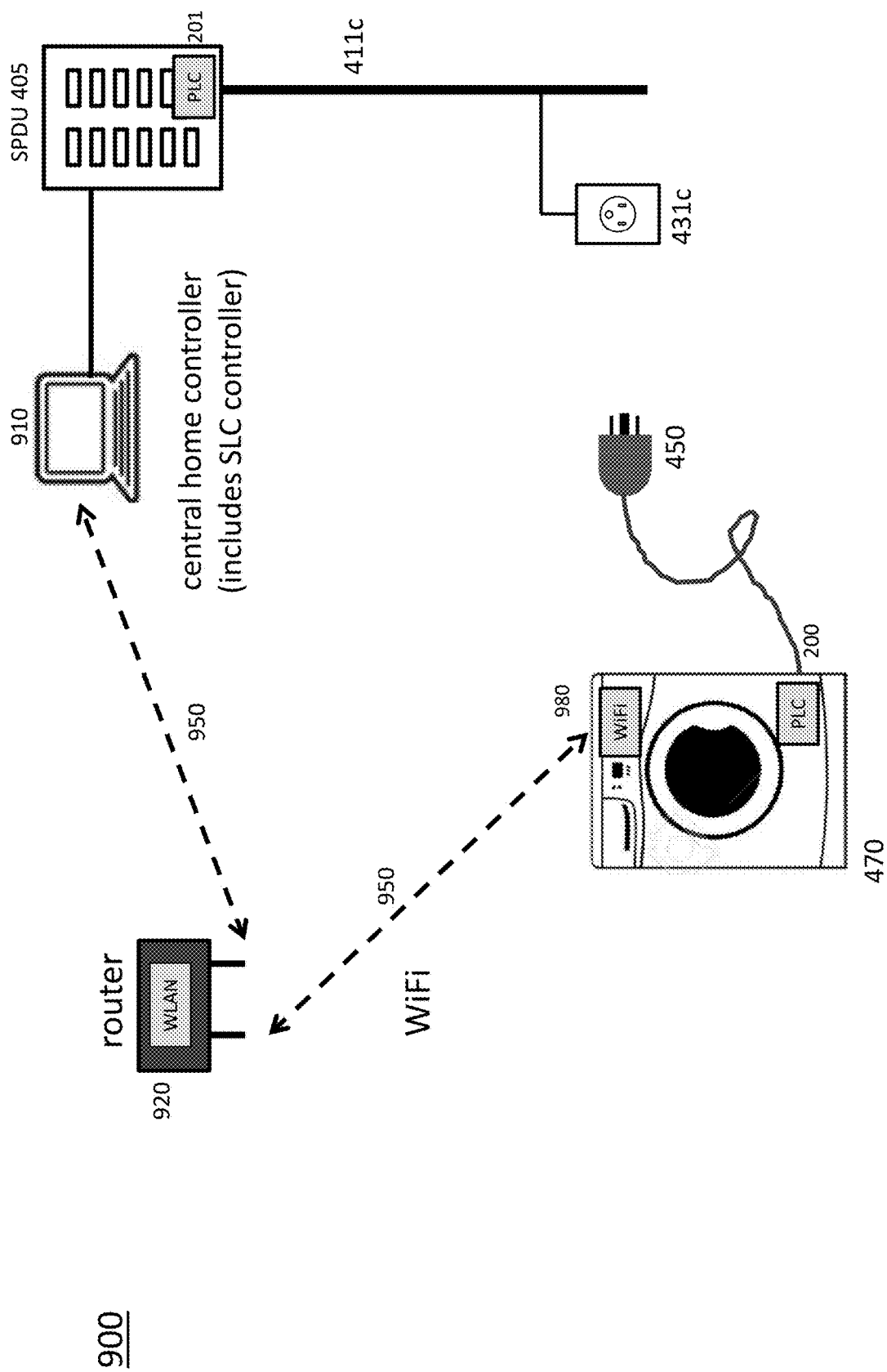
FIG. 9 is a network diagram of one embodiment of a hybrid wired-wireless architecture for control of the power delivered to a smart appliance including both PLC and wireless transceivers.

For a hybrid architecture using both wired and wireless communications, different embodiments may be envisioned. In FIG. 9, an embodiment 900 is shown where a PLC transceiver TRX 200 supporting the query procedure is embedded in the appliance 470. In this embodiment, the functionality of the SLC controller 406 (FIG. 2) is integrated into the central home controller 910, which accordingly directly controls the SPDU 405. In other embodiments (not shown) in which the SLC 402 (FIG. 2), as described in the '802 patent, has been installed in a residence or other facility, the central home controller 910 has a wired or wireless link to the SLC controller 406 within the SLC 402, and thus indirectly controls the SPDU 405 through the SLC controller 406.

When the electrical plug 450 of the appliance 470 is plugged into outlet 431c, the appliance 470 may register on the home network via wireless link 950. Thereafter, home controller 910 may order appliance 470 via wireless connection 950 to activate its PLC transceiver TX 200 to scan for query messages sent by PLC transceiver TX 201. Home controller 910 will subsequently send broadcast query messages on the circuits 411 and the PLC transceiver TRX 200 will determine the burst with the strongest RSSI. This information is then sent by appliance 470 back to the home controller 910 via its wireless transceiver 980 over the wireless link 950. From then on, home controller 910 knows to which circuit 411 the appliance 470 is connected. Via a (secure) link 950, home controller 910 may also find the power demands for appliance 470, user preferences, etc. Based on that information the home controller 910 may decide which energy source is provided to branch circuit 411c at what time of the day, and for how long. For this, it may also take into account the demands from other appliances sharing the same branch circuit (and thus being provided with the same power type—a grid or alternative). The home controller 910 may decide to turn on or off appliances (using the wireless link 950) to get a balanced power consumption on the branch circuit, or balance the overall consumption of, e.g., solar power. Other information communicated from the smart appliance 470 to the home controller 910 may include characteristics of the power requested, such as its source (grid, solar, generator, etc.), UPS back-up or not, AC or DC, the voltage and/or amperage required, the type of overcurrent protection (amps, time delay, GFCI, AFCI, Combi, etc.), and the number of kilowatt hours required and by when (e.g., an electric vehicle charger).

Figure 10:
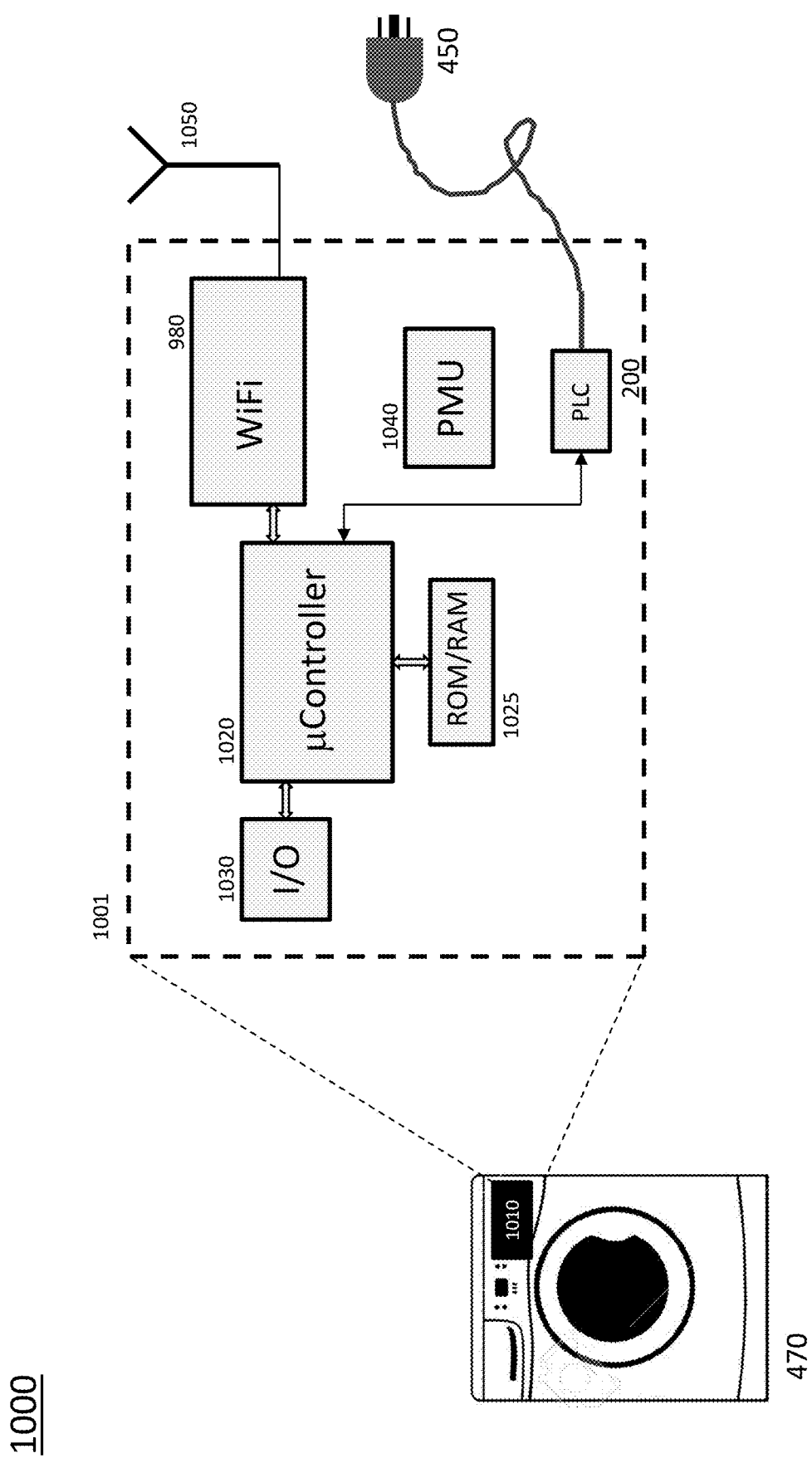
FIG. 10 is a functional block diagram of representative electronics in a control unit in the smart appliance of FIG. 9.

FIG. 10 shows a configuration of a control unit 1010 of appliance 470 according to one embodiment. The control unit 1010 comprises several functional blocks, which may be implemented by electronic components mounted on a Printed Circuit Board (PCB) 1001. Microcontroller 1020 controls the functioning of the appliance 470 directed by a program residing in memory 1025 which can be external or be integrated on the microcontroller chip 1020. I/O ports 1030 support the communications between motors, sensors, and actuators inside the appliance 470 and the microcontroller 1020. On the PCB 1001 is also a WiFi transceiver 980 to connect wirelessly to control unit 1010. An antenna 1050 tuned to the proper RF carrier is present to transmit and receive the wireless signals. To support the query procedure, a PLC transceiver TRX 200 is present at the entrance of the power cord connected to plug 450. A Power Management Unit 1040 (PMU) converts the 120 VAC power to suitable DC voltage levels supporting the electronics on the PCB 1001 (e.g., 1.8 V).

Figure 11:
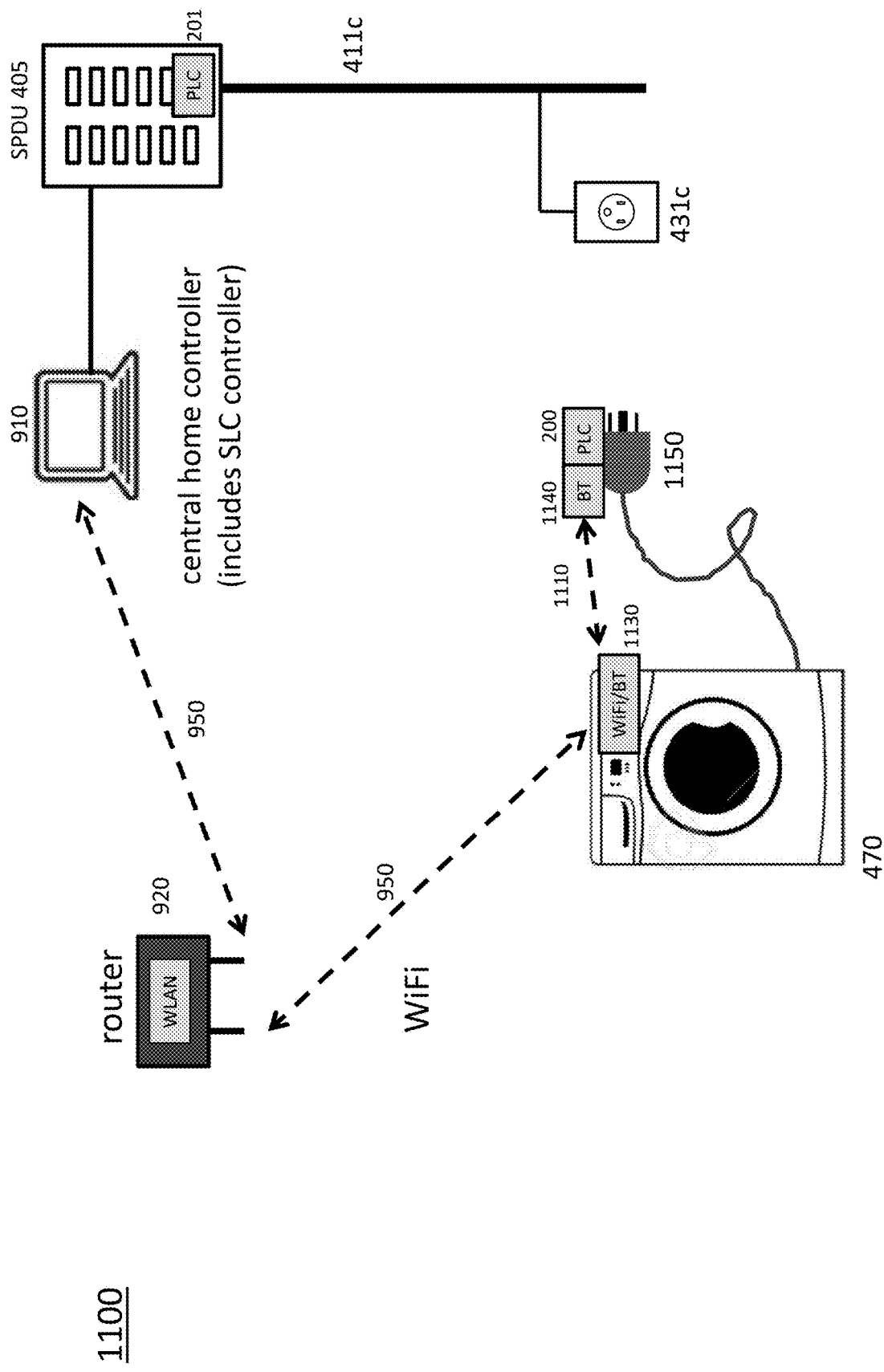
FIG. 11 is a network diagram of one embodiment of a hybrid wired-wireless architecture for control of the power delivered to a smart appliance having a PLC transceiver in the electrical plug.

The configuration as shown in FIG. 10 requires the PLC transceiver TRX 200 to be built into the control unit 1010 of appliance 470, requiring hardware changes as compared to current models. A PLC transceiver TRX 200 could instead be embedded in plug 450, but then the question arises how the query information is transferred from the plug to the control unit 1010 of appliance 470. A solution according to one embodiment is shown in FIG. 11. In this case, the smart plug 1150 contains both a PLC transceiver TX 200 and a short-range radio circuit 1140 that connects wirelessly to wireless transceiver 1130, which is part of the control unit 1010 of the smart appliance 470. In one embodiment, the short-range radio 1140 is a WiFi transceiver. However, since the demands on traffic and features are low, in another embodiment a lower-cost technology like Bluetooth is utilized. In one embodiment, preferably Bluetooth Low Energy (Bluetooth Smart) provides the plug-to-appliance communication link. In high volumes, Bluetooth Low-Energy chip prices are at or below 1 USD. The appliance 470 must then support both WiFi and Bluetooth. Dual-mode Bluetooth-WiFi chips are readily available and are used in high volumes in smartphones, tablets, laptops, and the like. Most likely, smart appliances 470 that include WiFi will have Bluetooth on board as well (if not activated, it may only require a software change to activate the Bluetooth radio).

In the embodiment of FIG. 11, the appliance 470 has a dual-mode transceiver 1130 supporting both WiFi and Bluetooth. A secure wireless link 1110 is present between the smart plug 1150 and the appliance 470. Addresses and security keys are based on a pre-pairing procedure carried out during manufacturing and assembly of the appliance 470 and no user interaction is required from the consumer. The PLC transceiver TRX 200 in the smart plug 1150 will support the query procedure of the electrical wiring, and will report its data to the Bluetooth transceiver 1140 in the smart plug 1150. The Bluetooth transceiver 1140 in the smart plug 1150 forwards the query data via Bluetooth link 1110 to the Bluetooth radio in transceiver 1130 in the appliance 470, which will internally provide this data to the WiFi radio in transceiver 1130. The WiFi radio will inform the home control unit 910 via the wireless link 950, possibly via the WLAN router 920 as described above. Assuming the smart appliance 470 has a dual-mode WiFi-Bluetooth transceiver 1130, the embodiment of FIG. 11 likely poses the lowest hurdle for appliance manufacturers to support the smart energy switching concept. All hardware requirements are placed on the smart plug 1150, and the appliance 470 requires only software reconfiguration.

Figure 12:
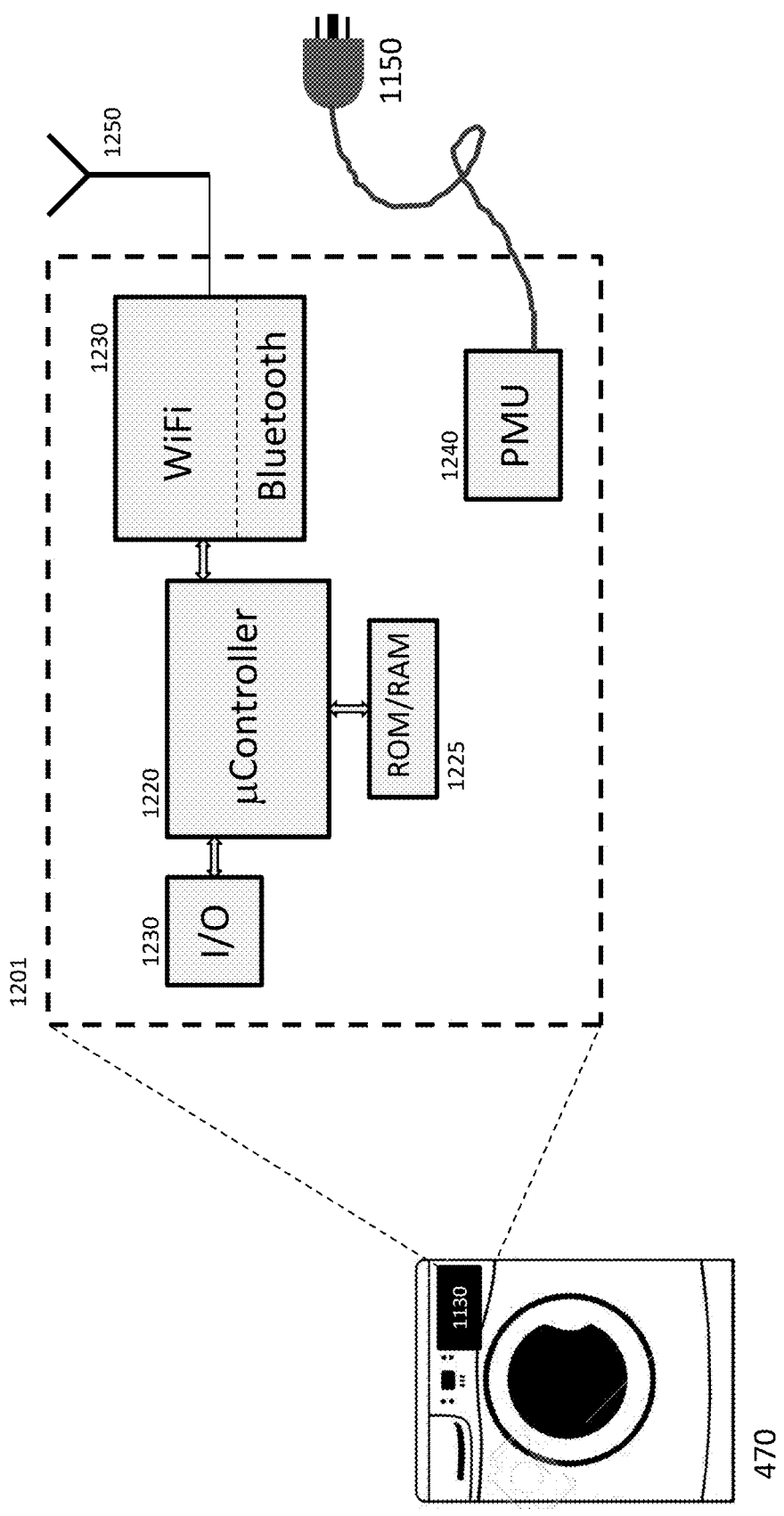
FIG. 12 is a functional block diagram of representative electronics in a control unit in the smart appliance of FIG. 11.

FIG. 12 shows one embodiment of the control unit 1130 of appliance 470 comprising several functional blocks, implemented as electronic components mounted on a Printed Circuit Board (PCB) 1201. Microcontroller 1220 controls the functioning of the appliance 470 directed by a program residing in memory 1225 which can be external or be integrated on the microcontroller chip 1220. I/O ports 1230 support the communications between motors, sensors, and actuators inside the appliance 470 and the microcontroller 1220. Embedded is a dual-mode Bluetooth/WiFi transceiver 1230 to connect wirelessly to the home control unit 910 via the WiFi link 950 and to connect wirelessly to the smart plug 1150 via the Bluetooth link 1110. An antenna 1250 tuned to the proper RF carrier(s) is present to transmit and receive the wireless signals for both WiFi and Bluetooth. A Power Management Unit 1240 (PMU) converts the 120 VAC power to suitable DC voltage levels supporting the electronics on the PCB 1201 (e.g., 1.8 V).

Figure 13:
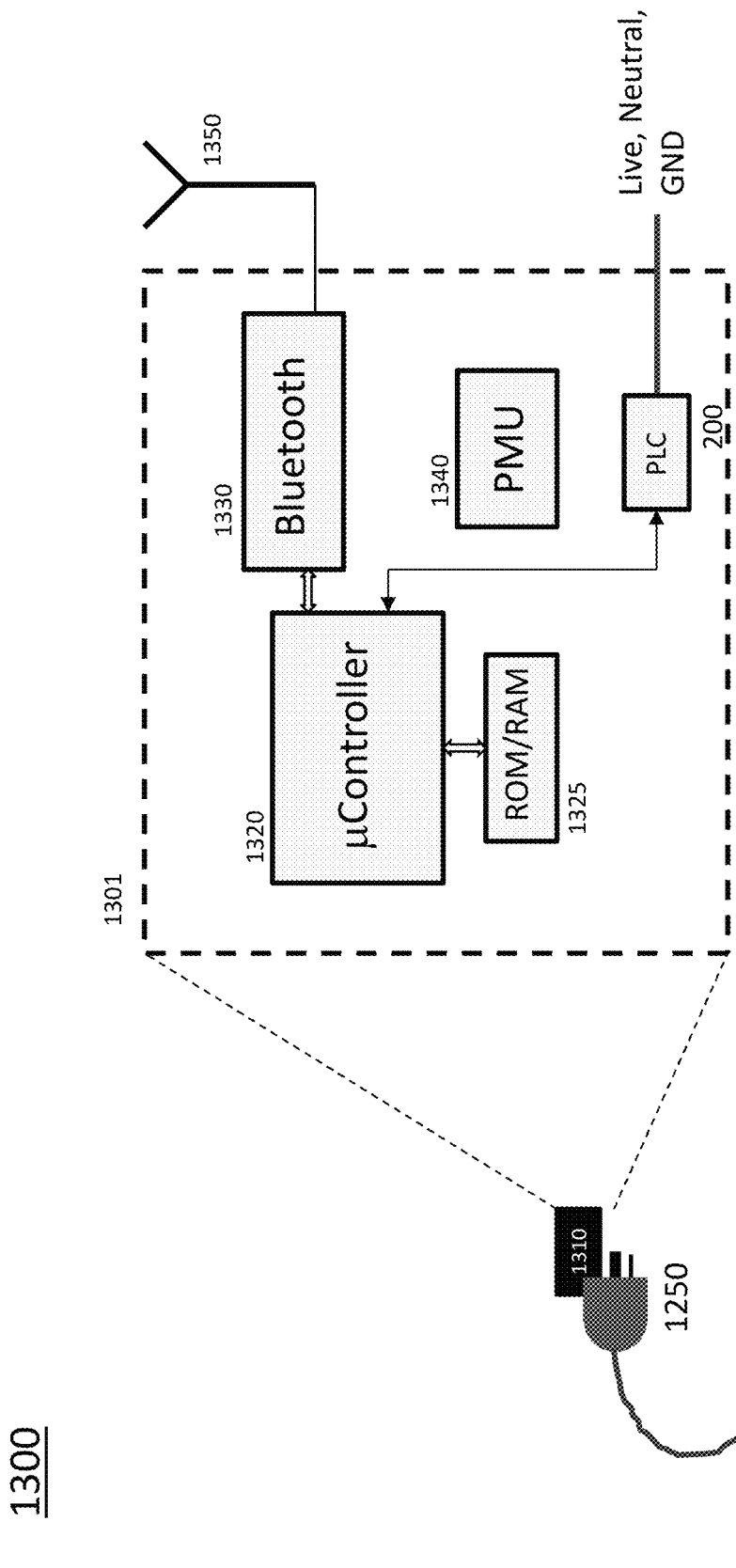
FIG. 13 is a functional block diagram of representative electronics in a smart plug according to the embodiment of FIG. 11.

FIG. 13 depicts the electronics according to one embodiment of the smart plug 1150. These components may be integrated onto a printed circuit board (PCB) 1301. A PLC transceiver TRX 200 supports the PLC query procedure on the electrical wiring. The transceiver TRX 200 is connected to microcontroller 1320. A Bluetooth (Low Energy) transceiver 1330 is connected to antenna 1350 to support a wireless link 1110 to the associated appliance. A power management unit 1340 is present to provide the proper power supply to the electronics. In one embodiment, the microcontroller 1320, memory 1325, and Bluetooth transceiver 1330 are integrated into a single chip. In another embodiment, the PLC transceiver TRX 200 is additionally integrated, leaving only the PLC coil T1 and capacitor C1 (FIG. 4), discrete components of the PMU 1340, and the antenna 1350 as external components.

In the above-described embodiments, a hybrid wired-wireless communication system is described where most communication between the home control unit 910 and appliance 470 is carried out on the wireless part, whereas the wired part only serves to identify to which branch circuit the appliance is connected. However, certain information may preferably be carried by the wire. Since eavesdropping on a wire link is much harder than on a radio link, information including passwords or setup information may be carried by the PLC system. For example, in one embodiment setup information for the appliance to register with the WiFi router 920 is carried by the PLC system, thus avoiding any user interaction on the appliance 470. This may also find utility in a multi-residential unit, such as apartments, where numerous W-Fi networks are in operation simultaneously. In one embodiment the home control unit 910 provides the appliance with a WiFi SSID, and in another embodiment additionally a pass code, so that it can register on the WLAN access point 920.

One advantage of the embodiment of FIGS. 11 and 12 is that an integrated WiFi-Bluetooth transceiver 1300 is deployed in practically every smartphone, and hence the part is widely available for integration into appliances, at low cost, and with sophisticated support and a robust development environment. Indeed, in many cases, it may be cheaper to install an integrated WiFi-Bluetooth transceiver 1300 and simply leave one of the protocols off, than to install either a stand-alone WiFi or Bluetooth transceiver. However, many of the first generation appliances deployed with wireless networking capability can be assumed to include only WiFi functionality. Accordingly, to enable these appliances to participate in the inventive hybrid wired/wireless network, the network configuration 1400 of FIG. 14 is also contemplated.

Figure 14:
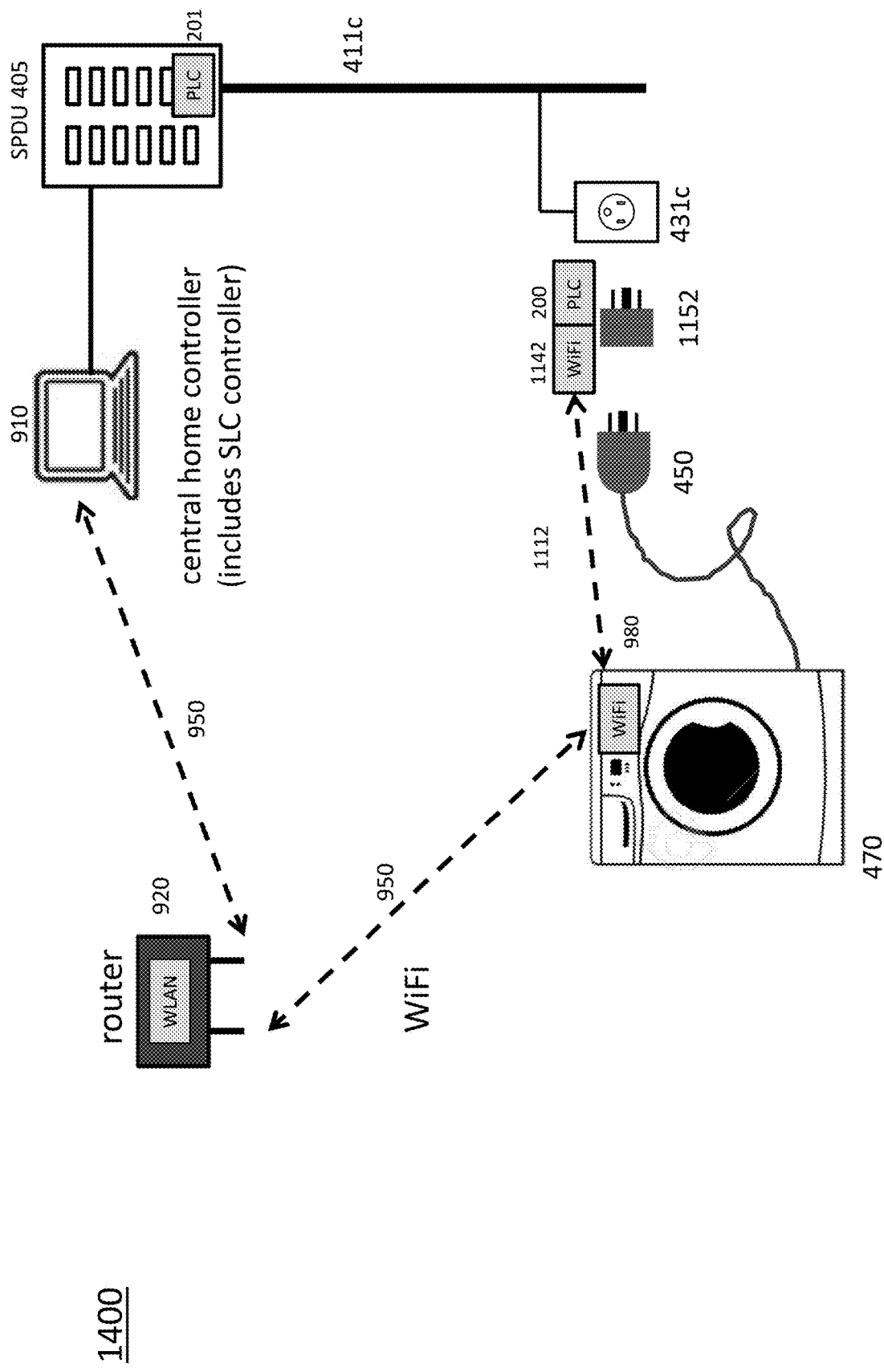
FIG. 14 is a network diagram of one embodiment of a hybrid wired-wireless architecture for control of the power delivered to a smart appliance plugged in through a smart adapter.

In FIG. 14, an appliance 470 includes a WiFi transceiver 980. A smart adapter 1152 is interposed between the electrical plug 450 of the appliance 470 and the electrical outlet 431c. The smart adapter 1152 passes the hot, neutral, and ground electrical connections directly to the appliance plug 450. Similar to the smart plug 1150 described above, the smart adapter 1152 also includes a PLC transceiver 200 and a WiFi transceiver 1142. The PLC transceiver 200 is operative to at least receive the branch circuit identification from the electrical wiring, and the WiFi transceiver 1142 passes this information on to the WiFi transceiver 980 in the appliance 470. In one embodiment, the WiFi transceivers 980, 1142 establish a WiFi Direct connection 1112, which is an ad-hoc, peer-to-peer connection that does not require participation of a WiFi access point such as the router 920. Alternatively, the WiFi transceiver 1142 in the smart adapter 1152 could join the broader wireless network 950, and pass branch circuit identification directly to the central controller 910. In this case, the central controller 910 must link the WiFi network addresses of the appliance WiFi transceiver 980 and the smart adapter WiFi transceiver 1142. A variety of ways to establish such a link may be readily envisioned. For example, instructions for use of the smart adapter 1152 could include that the appliance plug 450 should first be plugged into the smart adapter 1152, and then the latter plugged into the electrical outlet 431. This would ensure both the appliance 470 and smart adapter 1152 power up at the same time, and initialization software in each could include registering with the central controller 910, which would pair the two based on their functional identifications and the temporal proximity of their registrations. The electronics of the smart adapter 1152 are substantially similar to that depicted in FIG. 13, with the substitution of a WiFi transceiver (or integrated WiFi/BT transceiver) for the Bluetooth transceiver 1330, and the addition of a feed-through path for the electrical wires.

In one embodiment, instead of a separate smart adapter 1152, its functionality is integrated into the smart plug 450, rendering a smart plug configuration 1300 as shown in FIG. 13, but with the Bluetooth radio 1330 replaced with a WiFi radio 1142. In this embodiment, a legacy appliance with only WiFi capability can be upgraded to participate in the inventive hybrid wired/wireless network by replacing only its electrical plug.

In order for the central home controller 910 to communicate with the smart appliance 470 via PLC the appliance needs a unique Medium Access Control (MAC) address. Such a MAC address would be needed to pass, for example, WiFi setup information from the SLC to the appliance—for the branch circuit identification using the broadcast burst (i.e. query process), such a MAC would not be necessary, With this MAC address, the home control unit 910 can support a (bi-directional) point-to-point communication via PLC to smart appliance 470. This can be accomplished by an initial MAC assignment process, which may occur before or after the smart appliance has determined to which branch it is connected using the query process as described herein. In one embodiment, a random access mechanism is applied that makes use of listen-before-talk (LBT). As well known in the art, LBT is a form of anti-collision protocol that avoids interference in a wired or wireless network. A node with a pending transmission first monitors the communication channel for activity. If other communications are ongoing, the node starts a timer, which may include an assigned or provisioned value, or may be set to a random value. The node "backs off" until the timer expires, at which time it again monitors the channel for activity. When the channel is free for a predetermined duration, the node will begin its transmission.

Figure 15:
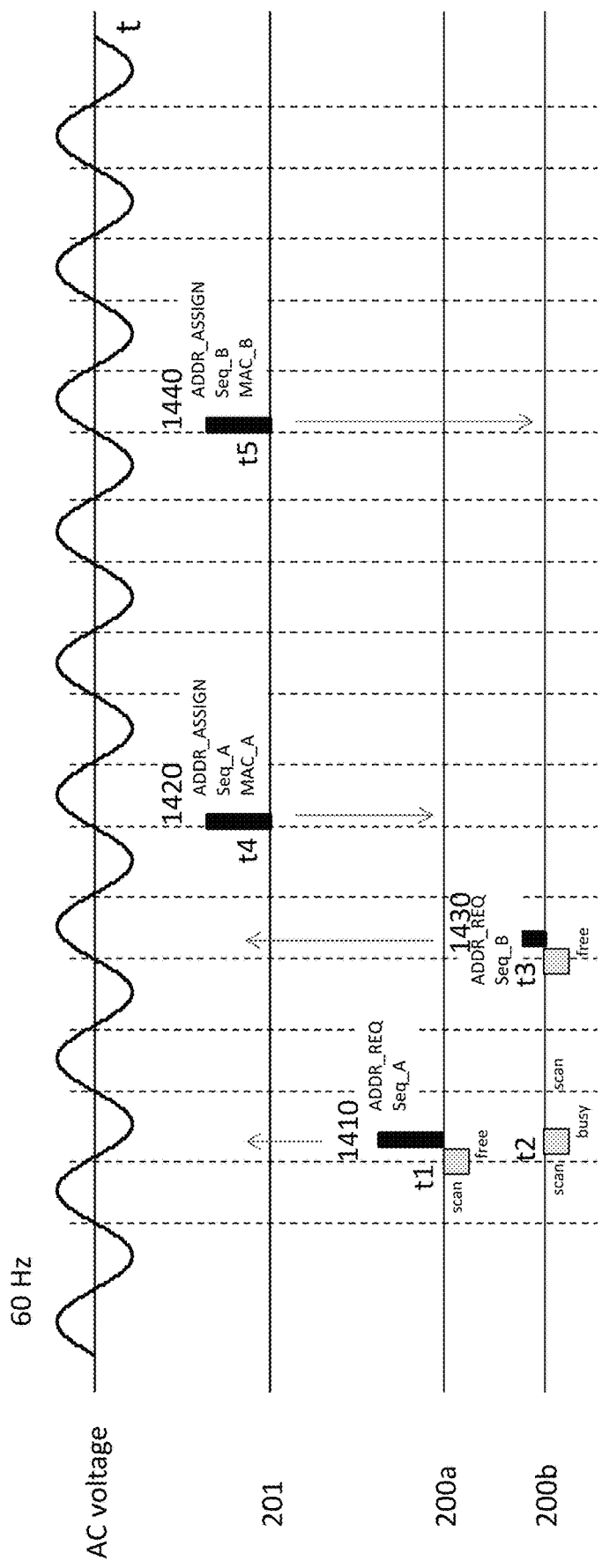
FIG. 15 is a timing diagram of PLC message exchange over the electrical wiring to assign MAC addresses to individual smart appliances.

As a timing reference, in one embodiment the zero crossing on the falling edge of the 120 VAC voltage is used, as depicted in FIG. 15. A PLC transceiver 200a that has not yet been assigned a PLC MAC address will listen to the wire line to detect if no power line communications are taking place. After listening for a random time duration starting at time t1, without detecting interference, it will send an address request message ADDR_REQ 1410 to PLC transceiver TX 201 residing in the SPDU 405. Preferably, the ADDR_REQ message contains a (random) request sequence Seq_A that temporarily identifies the requesting appliance. In response, the home controller 910 sends an assignment message ADDR_ASSIGN 1420 at time t4 containing the request sequence Seq_A and the newly assigned MAC address MAC_A. The new MAC address can be picked from a list of MAC addresses not yet assigned in the considered PLC system. If multiple appliances are requesting a MAC address, the random request sequence (which, when long enough, will with high probability be different for each requesting appliance) identifies the proper appliance for which the assignment message sent by the home controller 910 is intended. If during listening, the appliance finds the wire line busy, it will wait a random number of AC cycles and try again. For example, at t2, PLC transceiver 200b listens on the wire line and finds the line to be busy. It will refrain from transmitting but wait until time t3 to listen again. When it finds the wire line to be free, it will send an ADDR_REQ message 1420, including (random) request sequence Seq_B to PLC transceiver TX 201. The home controller 910 may respond with an assignment message ADDR_ASSIGN 1440 at time t5.

In another embodiment, no LBT and scanning is done, and the appliance 470 just sends an ADDR_REQ message at a random time (i.e. when the appliance is plugged into the outlet). It then waits for a random duration for the proper ADDR_ASSIGN message from the home controller 910 to arrive. If such ADDR_ASSIGN message is not received within a (random length) time window, the appliance 470 sends an ADDR_REQ message again. This procedure is repeated until appliance 470 receives the ADDR_ASSIGN message from the home controller 910. If collisions occur because multiple appliances send an ADDR_REQ message at the same time, no ADDR_ASSIGN messages will be sent by home control 910. But due to the random wait, when the appliances try again, with high probability they will send at different times thus avoiding a collision.

Figure 16:
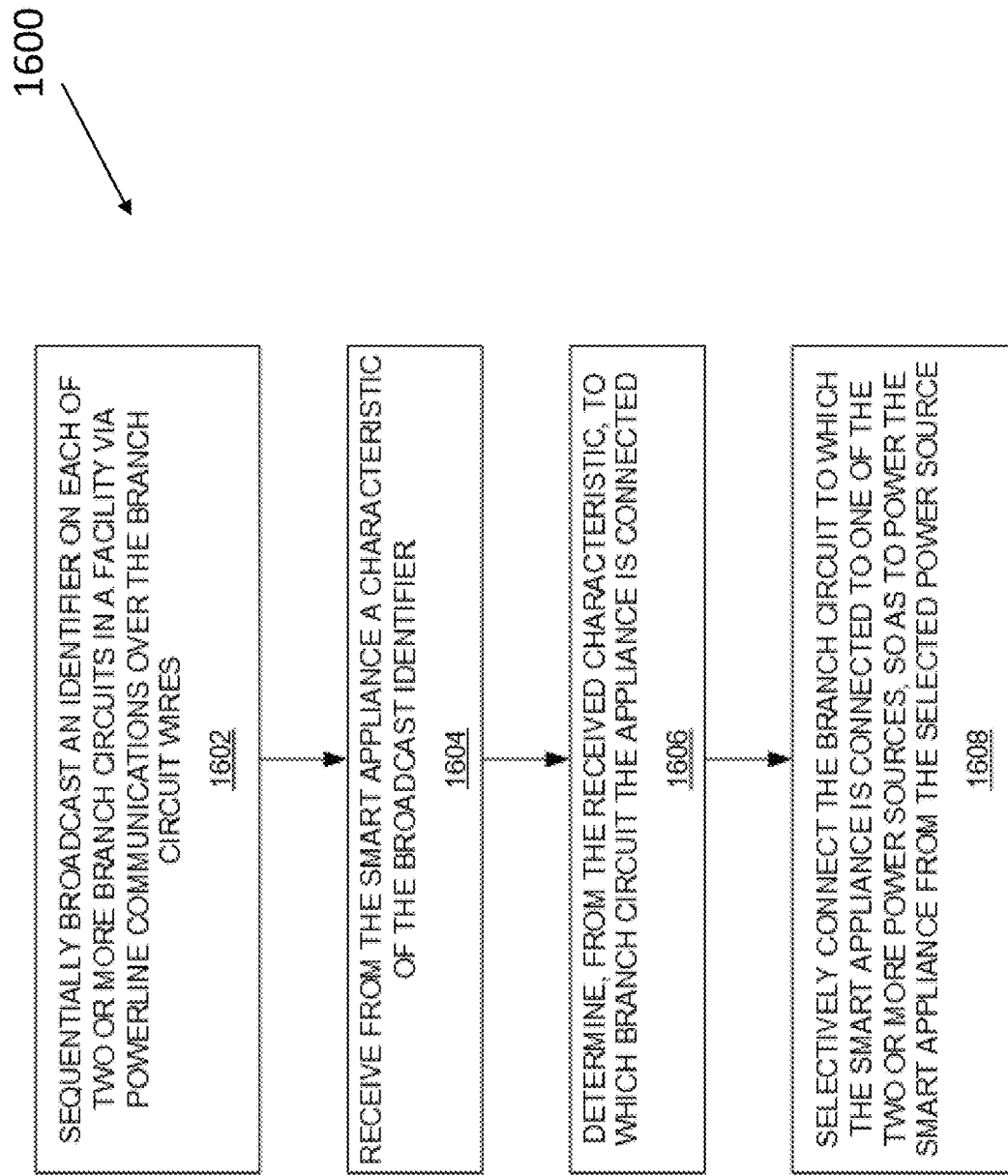
FIG. 16 is a flow diagram of a method of dynamically, selectively, and individually delivering power from one of two or more sources to a smart appliance.

FIG. 16 depicts a method 1600, performed by a SLC controller 406 (whether in the SLC 402 or part of a central controller 910), of dynamically, selectively, and individually delivering power from one of two or more sources to a smart appliance in a facility. An identifier is sequentially broadcast on each of two or more branch circuits in the facility via powerline communications over the branch circuit wires (block 1602). The identifier may be unique to each branch circuit, or may be the same (or random), with differentiation achieved via consideration of characteristics such as RSSI and arrival time. A characteristic of the broadcast identifier is received from the smart appliance (block 1604). The characteristic may for example comprise the RSSI or arrival time of the received identifier, or may comprise the identifier itself. To which branch circuit the smart appliance is connected, is determined from the received characteristic (block 1606). The branch circuit to which the smart appliance is connected is selectively connected to one of the two or more power sources, so as to power the smart appliance from the selected power source (block 1606).

Figure 17:
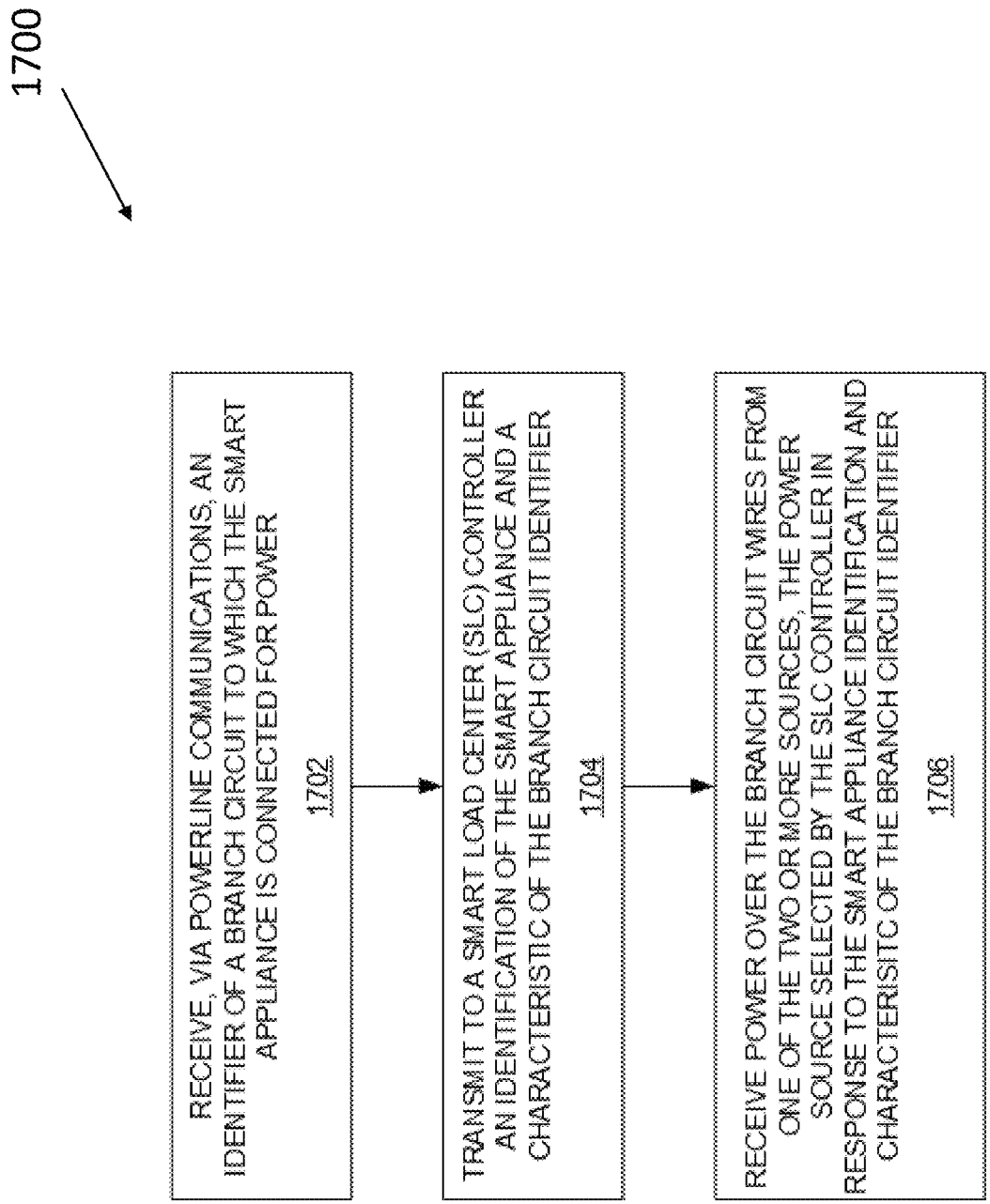
FIG. 17 is a flow diagram of a method, by a smart appliance, of facilitating the dynamic, selective, and individual delivery of power from one of two or more sources.

FIG. 17 depicts a method 1700, performed by a smart appliance, of facilitating the dynamic, selective, and individual delivery of power from one of two or more sources to the smart appliance in a facility. An identifier of a branch circuit, to which the smart appliance is connected for power, is received via powerline communications (block 1702). An identification of the smart appliance and a characteristic of the branch circuit identifier are transmitted to a SLC controller (block 1704). The characteristic may for example comprise the RSSI or arrival time of the received identifier, or may comprise the identifier itself. Power is received over the branch circuit wires from one of the two or more sources, the power source selected by the SLC controller in response to the smart appliance identification and the characteristic of the branch circuit identifier (block 1706).

In all embodiments, a microcontroller 1020, 1220, 1320 may comprise any sequential state machine operative to execute machine instructions stored as machine-readable computer programs stored in memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above. As used herein, the term "microcontroller" is synonymous with "processor," "microprocessor," and the like. As well known in the art, microcontrollers include memory in the form of registers, and possibly on-board cache memory, and may also be operatively connected to external memory. In all embodiments, such external memory 1025, 1225, 1325 may comprise any machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like. In some embodiments, the software may be retrieved by the microcontroller 1020, 1220, 1320 from a carrier which may comprise an electronic signal, optical signal, or radio signal, in addition to, or in lieu of, a computer readable storage medium such as memory 1025, 1225, 1325.

For convenience of explanation and to convey the inventive concepts to those of skill in the art, embodiments of the present invention have been described herein with reference to a residential installation—using terms such as "home controller;" describing the PLC feature as being implemented in a 120 V split-phase power system; using example of smart appliances typically found in a home, such as a washing machine or refrigerator; and the like. However, those of skill in the art will readily recognize that the present invention is not limited to residential installations, and embodiments described herein are readily and advantageously applied to various commercial and industrial facilities as well, such as office buildings, retail facilities, hospitals, campuses, factories, stadiums, and the like—indeed, any facility in which solar power may advantageously be utilized alongside utility grid power.

As used herein, the term "smart appliance" refers to a device, at least partially powered by electricity and plugged into an electrical outlet or hard-wired into a branch circuit in a facility, that includes both a powerline transceiver and a wireless transceiver. Note that this specific definition differs from marketing use of the term "smart appliance," which usually refers to appliances that include a wireless transceiver, and may be controlled by a smartphone app or otherwise join the IoT. In particular, as used herein a "smart appliance" is operative to determine to which branch circuit it is connected via powerline communications, and is operative to further or otherwise communicate with a SLC 402 or central controller 910 via a wireless network. Note that smart appliances are not limited to home-based machines for performing labor, but may include industrial equipment, computers, tools, lighting, HVAC, signs, and the like.

Embodiments of the present invention present numerous advantages over the prior art. Although wireless architectures have been proposed for home automation and Internet-of-Things networks for the home or other facilities, none of them contemplate the dynamic, selective, and individual delivery to appliances of power from different power sources. Embodiments of the present invention utilize powerline communications to efficiently provide for branch circuit identification, and utilize ubiquitous, low-cost, high-bandwidth, optionally secure wireless networks for concomitant communications. The combination enables dynamic control of solar (or other) power vs. grid power, maximizing the utility of the alternate power generation, with minimal additional cost and re-design required of modern smart appliances, which already include wireless transceivers. In some embodiments, the inherent security of powerline communication is further exploited to distribute credentials for secure communication over encrypted wireless networks. The PLC facilities further stand as a ready backup to wireless communication, e.g., in the face of a failure of the wireless interface in a smart appliance, or of a wireless router or other network node, enabling continued smart control of alternative vs. grid power.

The present invention may, of course, be constructed and practiced in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, performed by a Smart Load Center (SLC) controller, of dynamically, selectively, and individually delivering power from one of two or more sources to a smart appliance in a facility, comprising:
   sequentially broadcasting an identifier on each of two or more branch circuits in the facility via powerline communications over the branch circuit wires;
   receiving from the smart appliance a characteristic of the broadcast identifier;
   determining, from the received characteristic, to which branch circuit the appliance is connected; and
   selectively connecting the branch circuit to which the smart appliance is connected to one of the two or more power sources, so as to power the smart appliance from the selected power source.

2. The method of claim 1, further comprising performing load balancing by dynamically controlling the smart appliance to begin, delay, or cease tasks.

3. The method of claim 1 wherein the received characteristic of the broadcast identifier comprises one or more of the received signal strength and arrival time of the identifier at the smart appliance.

4. The method of claim 1 wherein the broadcast identifier is unique to each branch circuit, and wherein the received characteristic of the broadcast identifier is the unique identifier.

5. The method of claim 1 wherein receiving from the smart appliance a characteristic of the broadcast identifier comprises receiving the characteristic via a wireless communication link to the smart appliance.

6. The method of claim 5 wherein sequentially broadcasting an identifier on each of two or more branch circuits comprises broadcasting each identifier at a predetermined timing.

7. The method of claim 6 wherein the predetermined timing is a zero crossing of one of a rising or falling edge of a power waveform.

8. The method of claim 7 further comprising:
   receiving from the smart appliance a message requesting an address;
   in response to the address request message, transmitting to the smart appliance a message assigning a unique address.

9. The method of claim 8 wherein the message requesting an address includes a temporary identifier, and wherein the message assigning the unique address includes the temporary identifier.

10. The method of claim 8 wherein receiving the message requesting an address comprises receiving the message following a zero crossing of the other of the rising or falling power waveform edge defining the predetermined timing for broadcasting an identifier on a branch circuit.

11. The method of claim 8 further comprising, after assigning a unique address to the smart appliance:
    transmitting to the smart appliance, via powerline communications, information required for the smart appliance to communicate on a secured wireless network; and
    subsequently communicating with the smart appliance via the secured wireless network.

12. A method, performed by a smart appliance, of facilitating the dynamic, selective, and individual delivery of power from one of two or more sources to the smart appliance in a facility, comprising:
    receiving, via powerline communications, an identifier of a branch circuit to which the smart appliance is connected for power;
    transmitting to a Smart Load Center (SLC) controller an identification of the smart appliance and a characteristic of the branch circuit identifier; and
    receiving power over the branch circuit wires from one of the two or more sources, the power source selected by the SLC controller in response to the smart appliance identification and characteristic of the branch circuit identifier.

13. The method of claim 12, further comprising dynamically beginning, delaying, or ceasing tasks in response to a command from the SLC controller.

14. The method of claim 12 wherein the received characteristic of the branch circuit identifier comprises one or more of the received signal strength and arrival time of the identifier at the smart appliance.

15. The method of claim 12 wherein the identifier is unique to each branch circuit, and wherein the characteristic of the branch circuit identifier is the received unique identifier.

16. The method of claim 12 wherein transmitting the smart appliance identification and characteristic of the branch circuit identifier to the SLC controller comprises transmitting the information via a wireless network.

17. The method of claim 12 wherein receiving an identifier of a branch circuit comprises monitoring, via a powerline communication receiver, one or more branch circuit wires to which the smart appliance is connected, at a predetermined timing.

18. The method of claim 17 further comprising:
receiving, at a plurality of instances of the predetermined timing, a plurality of branch code identifiers;
measuring the signal strength at which each branch code identifier is received;
comparing the received signal strengths of the branch code identifiers; and
determining the branch to which the smart appliance is connected to be the branch code identifier with the greatest received signal strength.

19. The method of claim 17 wherein the predetermined timing is a zero crossing of one of a rising or falling edge of a power waveform on the branch circuit wires.

20. The method of claim 19 further comprising:
transmitting, via powerline communications, a message to the SLC controller requesting an address; and
in response to the address request message, receiving a message from the SLC controller assigning a unique address to the smart appliance.

21. The method of claim 20 wherein the message requesting an address includes a temporary identifier, and wherein the message assigning the unique address includes the temporary identifier.

22. The method of claim 20 wherein transmitting the message requesting an address comprises transmitting the message after a listen-before-talk delay following a zero crossing of the other of the rising or falling power waveform edge defining the predetermined timing for broadcasting a unique identifier on a branch circuit.

23. The method of claim 20 wherein the transmitting the message requesting an address and receiving a message assigning a unique address comprises:
transmitting the message requesting an address;
monitoring for a message assigning a unique address for a determined duration; and
if the message assigning a unique address is not received within the determined duration, repeating the transmitting and monitoring steps.

24. The method of claim 20 further comprising, after receiving a unique address assignment:
receiving, via powerline communications including the unique address, information required for the smart appliance to communicate on a secured wireless network; and
using the information to access the secured wireless network.

25. The method of claim 12 wherein receiving, via powerline communications, an identifier of a branch circuit to which the smart appliance is connected for power comprises receiving the identifier by a powerline communication receiver within the smart appliance.

26. The method of claim 12 wherein receiving, via powerline communications, an identifier of a branch circuit to which the smart appliance is connected for power comprises receiving the identifier, via a wireless link, from circuitry in one of an electrical outlet plug connected to the smart appliance and a smart adapter interposed between a smart appliance electrical plug and an electrical outlet connected to the branch circuit, the circuitry in the electrical outlet plug or smart adapter including a powerline communication receiver and a wireless transmitter.

27. A Smart Load Center (SLC), comprising:
a first input operative to receive electrical power from a first power source;
a second input operative to receive electrical power from a second power source;
a plurality of branch circuit outputs;
a plurality of switches, each operative to connect a branch circuit alternatively to the first or second power source;
a plurality of powerline communication transceivers, each operative to transmit and receive data over one or more power distribution wires of a branch circuit; and
a SLC controller including a wireless transceiver and operative to
sequentially broadcast, on each successive branch circuit, an identifier using powerline communications;
wirelessly receive, from a smart appliance connected to a branch circuit, an indication of usage and a characteristic of the branch circuit identifier;
determine, from the received characteristic, to which branch circuit the appliance is connected; and
control a switch associated with the identified branch circuit to supply power from the first or the second power source to the smart appliance.

28. The SLC of claim 27, wherein the controller is further operative to perform load balancing by dynamically controlling the smart appliance to begin, delay, or cease tasks.

29. The SLC of claim 27 wherein the SLC controller comprises:
the wireless transceiver;
a processor;
memory; and
a wired or wireless connection to the plurality of switches and plurality of powerline communication transceivers.

30. The SLC of claim 27 wherein the SLC controller is a central facility controller including a wireless transceiver, and having a wired or wireless connection to the plurality of switches and plurality of powerline communication transceivers.

31. The SLC of claim 27 wherein the processor is operative to sequentially broadcast the branch circuit identifier on each successive branch circuit at a predetermined timing.

32. The SLC of claim 27 wherein the predetermined timing is a zero crossing of one of a rising or falling edge of a power waveform.

33. The SLC of claim 31 wherein the processor is further operative to:
receive from the smart appliance, via powerline communications, a message requesting a unique address, the message including a temporary identifier;
assign to the smart appliance a unique address; and
transmit to the smart appliance, via powerline communications, a message assigning the unique address, the message including the temporary identifier.

34. The SLC of claim 33 wherein the processor is operative to receive the message requesting an address by receiving the message following a zero crossing of the other of the rising or falling power waveform edge defining the predetermined timing for broadcasting a unique identifier on a branch circuit.

35. The SLC of claim 33 wherein the processor is further operative to, after assigning a unique address to the smart appliance:

transmit to the smart appliance, via powerline communications, information required for the smart appliance to communicate on a secured wireless network; and
subsequently communicate with the smart appliance via the secured wireless network.

\* \* \* \* \*